(12) United States Patent
Valenza et al.

(10) Patent No.: US 12,177,686 B2
(45) Date of Patent: *Dec. 24, 2024

(54) THREE-DIMENSIONAL VISUALIZATION OF Wi-Fi SIGNAL PROPAGATION BASED ON TELEMETRY DATA

(71) Applicant: Cisco Technology, Inc., San Jose, CA (US)

(72) Inventors: Salvatore Valenza, Pomy (CH); Samer Salam, Beirut (LB); Taha Hajar, Chavannes-Renens (CH); Nikodin Ristanovic, Lausanne (CH); Arun G. Khanna, Sunnyvale, CA (US); Matthew Aaron Silverman, Shaker Heights, OH (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/468,884

(22) Filed: Sep. 18, 2023

(65) Prior Publication Data

US 2024/0022919 A1 Jan. 18, 2024

Related U.S. Application Data

(63) Continuation of application No. 17/409,468, filed on Aug. 23, 2021, now Pat. No. 11,785,477.

(Continued)

(51) Int. Cl.
*H04W 16/22* (2009.01)
*H04B 17/318* (2015.01)
(Continued)

(52) U.S. Cl.
CPC ........ *H04W 16/225* (2013.01); *H04B 17/318* (2015.01); *H04B 17/391* (2015.01); *H04W 16/20* (2013.01)

(58) Field of Classification Search
CPC ... H04W 16/225; H04W 16/20; H04W 84/12; H04W 52/243; H04W 52/343; H04B 17/318; H04B 17/391; H04B 17/3913
See application file for complete search history.

(56) References Cited

U.S. PATENT DOCUMENTS 9,131,403 B1 9/2015 Courchesne et al.
2005/0043933 A1* 2/2005 Rappaport .......... H04L 41/5032
703/1

(Continued)

FOREIGN PATENT DOCUMENTS

CN 111355546 A 6/2020
CN 107705359 B 7/2020

*Primary Examiner* — Chae S Lee
(74) *Attorney, Agent, or Firm* — Polsinelli P.C.

(57) ABSTRACT

The present technology is directed to providing a 3-D visualization of a Wi-Fi signal propagation pattern based on telemetry data. The present technology can receive telemetry data for a Wi-Fi access point located at a location of a building plan in a Wi-Fi visualization system, store the telemetry data with a timestamp, determine a change in a Wi-Fi coverage for the Wi-Fi access point based on the telemetry data, and present a visualization illustrating the change in the Wi-Fi coverage for the Wi-Fi access point. The present technology can further present an animation of the change in the Wi-Fi coverage for the Wi-Fi access point based on the stored telemetry data.

20 Claims, 27 Drawing Sheets

Related U.S. Application Data

(60) Provisional application No. 63/224,354, filed on Jul. 21, 2021.

(51) Int. Cl.
    *H04B 17/391*    (2015.01)
    *H04W 16/20*     (2009.01)

(56) References Cited

U.S. PATENT DOCUMENTS

| | | | |
|---|---|---|---|
| 2005/0152312 A1* | 7/2005 | Marinier | H04W 16/18 |
| | | | 370/332 |
| 2009/0278849 A1 | 11/2009 | Williams | |
| 2018/0102858 A1 | 4/2018 | Tiwari et al. | |
| 2020/0052981 A1* | 2/2020 | Pandey | H04L 41/0645 |
| 2020/0068413 A1 | 2/2020 | Hadley | |
| 2021/0084450 A1 | 3/2021 | Catalena | |
| 2021/0344612 A1 | 11/2021 | Files et al. | |
| 2022/0319073 A1 | 10/2022 | Balaraman | |

* cited by examiner

THREE-DIMENSIONAL VISUALIZATION OF Wi-Fi SIGNAL PROPAGATION BASED ON TELEMETRY DATA

CROSS REFERENCE TO RELATED APPLICATIONS

This application is a continuation application of U.S. Non-Provisional patent application Ser. No. 17/409,468, filed Aug. 23, 2021, which claims the benefit of priority to U.S. provisional application No. 63/224,354 filed on Jul. 21, 2021, the disclosures of which are herein incorporated by reference in their entirety.

TECHNICAL FIELD

The subject matter of this disclosure relates in general to the field of wireless networks, and more particularly, to systems and methods for providing a three-dimensional (3-D) visualization of a wireless signal propagation based on telemetry data.

BACKGROUND

With growing interest in optimizing the wireless network infrastructure to improve the wireless network performance, various wireless network planning tools are available for analyzing, visualizing, and troubleshooting the wireless signal propagation of the wireless network. A visualization of the wireless signal propagation can help understanding the signal propagation (e.g., Wi-Fi coverage) and assessing the signal propagation behavior (e.g., signal strength) so that an optimized wireless network can be designed as to where to place or how to configure Wi-Fi access points.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not, therefore, to be considered to be limiting of its scope, the principles herein are described and explained with additional specificity and detail through the use of the accompanying drawings in which.

DETAILED DESCRIPTION

Figure 1:
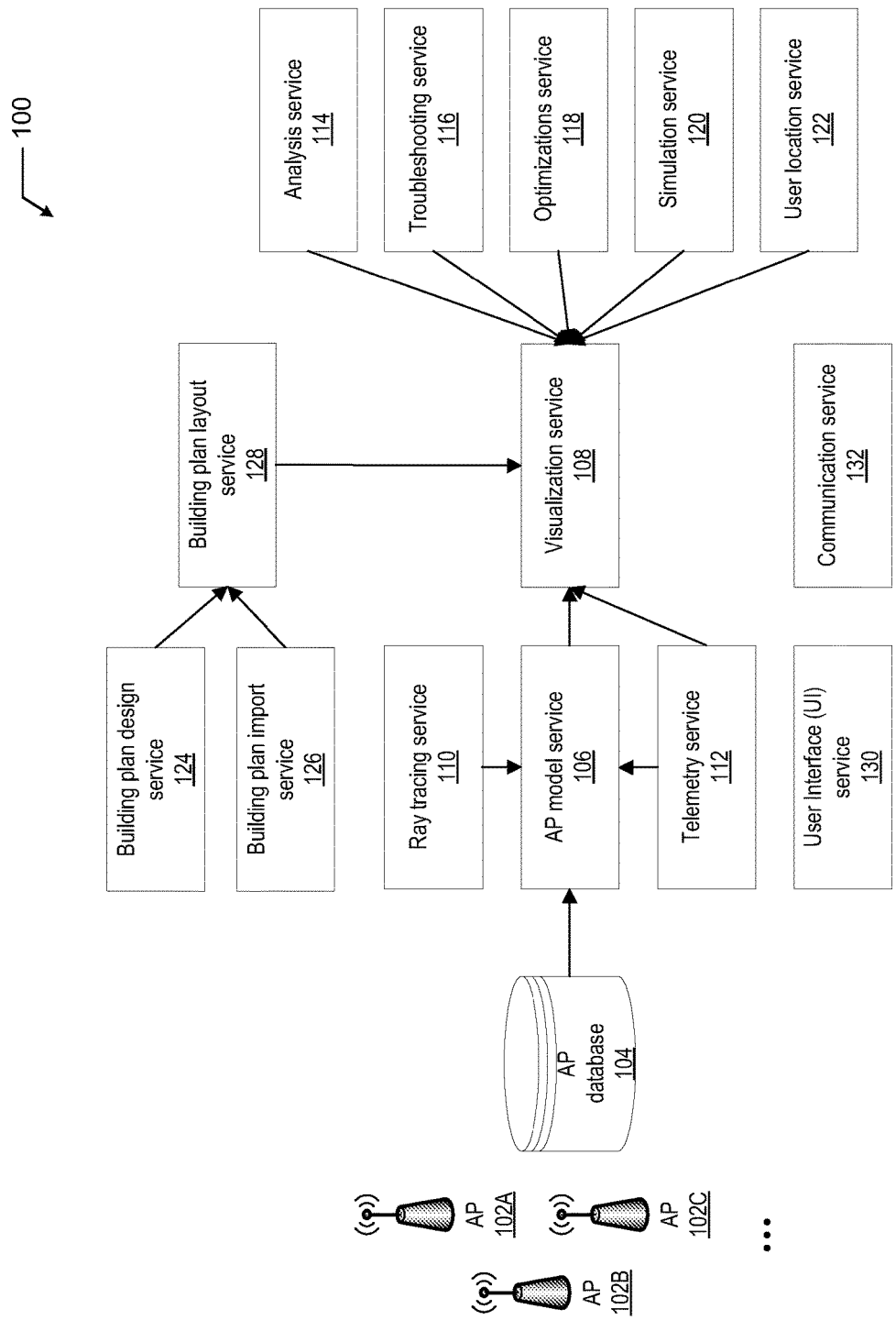
FIG. 1 illustrates an example visualization system for presenting a wireless signal propagation in 3-D according to some aspects of the disclosed technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Designing and planning a Wi-Fi network can be difficult due to dynamic networking environments. For example, a wireless LAN controller (WLC) continuously needs to adjust the wireless network setting to adapt to changing conditions. Some wireless network planning tools provide a visualization of the wireless signal propagation based on simulated or plotted data sets. However, such simulations or predictions cannot provide an accurate view of the dynamic behavior of the network (e.g., interference level, client density, or transmission power level throughout the day).

Therefore, there exists a need for a visualization tool that can provide accurate and reliable measurement of the wireless network. There is also a strong need to provide a 3-D visualization of a Wi-Fi signal propagation based on telemetry data.

The present technology includes systems, methods, and computer-readable media for solving these problems and discrepancies. Specifically, systems, methods, and computer-readable media for providing a 3-D visualization of a Wi-Fi signal propagation based on telemetry data are provided in the present disclosure.

Overview

Disclosed are systems, apparatuses, methods, and computer-readable media for visualizing a Wi-Fi AP RF propagation pattern based on telemetry data. According to at least one example of the present technology, a method includes receiving telemetry data for at least one Wi-Fi AP located at a location of a building plan in a Wi-Fi visualization system, determining a change in Wi-Fi coverage for the at least one Wi-Fi AP based on the telemetry data, and presenting a visualization illustrating the change in the Wi-Fi coverage for the at least one Wi-Fi AP. The telemetry data is received in real-time and includes a dynamic channel assignment, dynamic frequency selection (DFS), channel loads, co-channel interference, or transmission power level adjustment.

Description

FIG. 1 illustrates an example 3-D signal propagation visualization system 100 for presenting a wireless signal propagation in 3-D according to some aspects of the disclosed technology. As shown in FIG. 1, the 3-D signal propagation visualization system 100 can include one or more services primarily responsible for examining and analyzing signals from a plurality of access points (APs) 102A, 102B, 102C, . . . (collectively, 102), determining a signal propagation pattern for the APs 102 based on a signal propagation model, and providing a 3-D visualization of the signal propagation pattern including analysis, troubleshooting, simulations, or optimizations of the signal propagation pattern.

The 3-D signal propagation visualization system 100 can include an AP database 104 that includes information about the plurality of APs 102, which are configured to transmit wireless communication signals. In some aspects, the information about the plurality of APs 102 can include, but is not limited to a location of APs 102 and their orientation (e.g., azimuth and elevation angles), a model number, a signal strength, end-of-life data, an antenna type, a channel, a frequency (band), or network information of which the APs 102 belong.

The 3-D signal propagation visualization system 100 can include an AP model service 106 that is a collection of signal propagation models for different types of AP antennae 102. In some examples, the signal propagation model includes a description of the signal propagation pattern based on the information associated with the AP antennae 102. For example, such information can be provided by the AP database 104 or related to parameters derived from various configuration attributes and measurements such as transmission power (txPower), signal-to-noise ratio (SNR), Key Performance Indicator (KPI) values, or Received Signal Strength Indication (RSSI) values.

The 3-D signal propagation visualization system 100 can include a visualization service 108 configured to perform 3-D modeling, i.e., display a 3-D visualization of the signal propagation pattern based on the signal propagation model. In some examples, the visualization service 108 can display the 3-D visualization of the signal propagation in the form of a heatmap, which uses color-coding to represent different values of the signal strength. In some instances, the visualization service 108 can generate a time-based (temporal) visualization where changes in the signal propagation pattern over time can be presented in the 3-D visualization.

The 3-D signal propagation visualization system 100 can also include a ray tracing service 110 configured to perform ray tracing from a particular AP. In some examples, the ray-tracing service 110 can compute attenuation based on the line-of-sight from a particular AP to a certain vertex in space. For example, ray tracing can be used to visualize the signal propagation by tracing paths of electromagnetic waves and simulating the way that the waves interact with any objects it may hit. If a straight line is drawn from a particular AP and does not hit anything in the space, then the signal propagation model works in a straightforward manner. On the other hand, if there is an obstacle (e.g., a wall, shelving, ceiling, etc.) along the path, the signal propagation pattern can be broken into multiple segments since the signal propagation pattern can change depending on the properties of the obstacle that the pattern has to pass through.

The 3-D signal propagation visualization system 100 can include a telemetry service 112 configured to collect and record data from the plurality of APs 102 or sensors on the floor pertaining to the APs 102 in space. In some examples, the telemetry data can be used to update information about a particular AP (e.g., model, antenna type, etc.) or feed into the visualization service 108 to provide an optimized 3-D visualization instead of relying on a predicted model. In some instances, the telemetry service 112 can utilize the telemetry data to validate a certain predicted model.

The 3-D signal propagation visualization system 100 can also include an analysis service 114 that is configured to analyze data associated with the wireless coverage such as SNR measurements, latency measurements, a number of client devices associated with each of the APs, KPI values, txPower measurements, or RSSI measurements. In some instances, the analysis service 114 can further perform analysis pertaining to data associated with one or more errors or constraints of the APs 102 that can impact the wireless coverage.

The 3-D signal propagation visualization system 100 can include a troubleshooting service 116 configured to perform various types of troubleshooting by isolating and root-causing issues or errors relating to the network performance and signal propagation pattern based on the APs 102 and providing suggestions to resolve such issues or errors. In some examples, the troubleshooting service 116 can identify both cause and consequences of the issues, for example, obstructions in the line of sight, a level of signal coverage, a number of client devices connected to APs, co-channel interference, or stickiness of roaming clients to APs.

The 3-D signal propagation visualization system 100 can include an optimization service 118 configured to provide a 3-D visualization of the optimized signal propagation pattern that provides better operational signal coverage and lower interference. In some examples, the optimization service 118 can provide an upgrade option for the APs or configuration settings to achieve improved network performance. In some instances, the optimization service 118 can provide the optimized 3-D visualization that illustrates dynamic changes as conditions in the network change. In some examples, the optimization service 118 can propose different optimized layouts by radio spectrum (RF) or deployment of the APs for a given space.

The 3-D signal propagation visualization system 100 can also include a simulation service 120 configured to simulate various scenarios relating to deployment of APs, potential network failures, estimated RF leakage, or alternative network configurations. In some instances, the simulation service 120 can provide a simulated 3-D visualization of the various proposed layouts provided by the optimization service 118.

In some examples, the simulation service 120 can provide a simulated 3-D visualization illustrating the impact of an alternative deployment of APs, for example, how the signal propagation pattern is impacted by deploying a new or upgraded AP at different locations on the floor. Also, the simulation service 120 can simulate a 3-D visualization based on the impact of an upgrade or different AP upgrade strategies prior to the actual update to observe and compare the wireless coverage.

Furthermore, a type of materials of obstructions in the space can significantly impact the signal propagation pattern. The simulation service 120 can provide a simulated visualization of the signal propagation pattern depending on the type of materials of obstacles such as walls or shelving, or what is stored on shelving (e.g., liquid, metal, non-metal, etc.).

Additionally, the simulation service 120 can provide a simulated 3-D visualization illustrating potential network failures. For example, the simulation service 120 can help define coverage zones to avoid coverage blackout zones in common.

The 3-D signal propagation visualization system 100 can also include a user location service 122 configured to identify a location of a user (e.g., client device) and obtain data associated with the user/client device to determine the signal propagation pattern. For example, a client density can significantly affect the wireless network coverage.

In some examples, the user location identified by the user location service 122 can be combined with an AP coverage so that the 3-D visualization can include the impact of the client device such as an operating system of client devices, client device density, or any RF interference due to the presence of RF-emitting device (e.g., mobile phones, cordless phones, wireless security cameras, etc.).

In some examples, the user location service 122 can help to optimize the latency and the signal propagation pattern by identifying the location of client devices and the type of services that the client devices are performing. For example, too many client devices performing VoIP calls on the same AP can worsen the network performance and cause a bad call quality due to latencies. The 3-D visualization of the signal propagation pattern can include the user location provided by the user location service 122 to illustrate such impact of the client devices on the wireless network coverage.

The 3-D signal propagation visualization system 100 can also include a building plan design service 124 configured to allow a user to manage the settings of the building plan or the floor plan of the space (e.g., layout, objects, viewpoint, etc.).

The 3-D signal propagation visualization system 100 can include a building plan import service 126 configured to import a building plan or a floor plan. The building plan or the floor plan can be in any suitable format, for example, a Building Information Modeling (BIM) file or a Computer-Aided Design (CAD) file. In some examples, the building plan import service 126 can import the building plan or the floor plan that contains a technical drawing, blueprint, schematic, or 3-D rendering of the floor that is to be visualized in 3-D.

In some instances, the signal propagation pattern can be overlaid over the building plan or the floor plan provided by the building plan import service 126. Depending on the type of the imported file for the building plan, details of the building or the floor such as a type of materials of the obstacles (e.g., a wall, etc.) or location of APs or sensors can further be included in the building plan.

The 3-D signal propagation visualization system 100 can also include a building plan layout service 128 configured to store the building plan layout and support the 3-D visualization of the building plan layout. In some examples, the building plan layout service 128 can perform the function of a management and control platform for managing, monitoring, and storing data associated with the visualization based on the building plan.

The 3-D signal propagation visualization system 100 can also include a user interface service 130 configured to allow a user to manage and control settings of the visualization or network configurations to optimize the 3-D visualization. For example, the settings can include a viewpoint (e.g., a first-person perspective, an orbit view, or a bird's eye view), layout, parameters (e.g., txPower, SNR measurements, KPI values, RSSI values, etc.), or visualization options. Also, the examples of network configurations can include but are not limited to elevation or azimuth angle of APs, deployment of APs, band and a type of network or APs.

In some instances, the user interface service 130 can provide information to or receive feedback from the user via a communication service 132 as further described below. In some examples, the user may be asked to evaluate and manage various suggestions proposed by the troubleshooting service 116 or the optimization service 118.

The 3-D signal propagation visualization system 100 can also include a communication service 132 configured to transmit and receive information wirelessly over a network. In some examples, the communication service 132 can send and receive communications from/to a building plan system (not shown) that may provide building plan updates. In some instances, the communication service 132 can transmit and receive data from/to a user for analyzing, troubleshooting, simulating, or optimizing the 3-D visualization of the signal propagation pattern.

Figure 2:
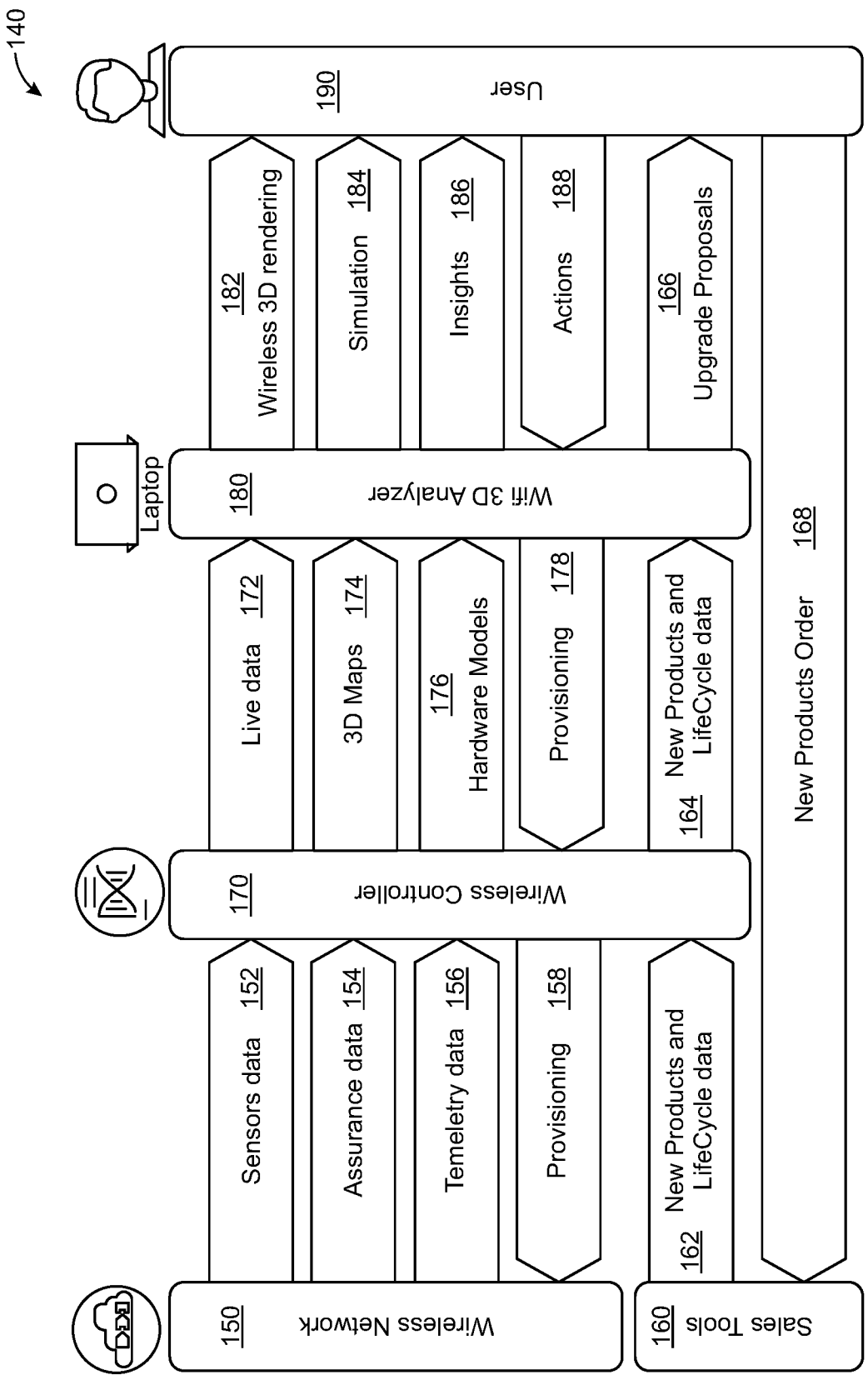
FIG. 2 illustrates an example network architecture of a visualization system for presenting a wireless signal propagation in 3-D according to some aspects of the disclosed technology.

FIG. 2 illustrates an example network architecture 140 for the 3-D signal propagation visualization system 100 illustrated in FIG. 1 according to some aspects of the disclosed technology. The network architecture 140 comprises a wireless network 150, sales tools 160, a network controller 170, a Wi-Fi 3D analyzer 180, and a user 190. In some embodiments, Wi-Fi 3D analyzer 180 executes on a client device and takes advantage of hardware acceleration capabilities from a graphics processor, but Wi-Fi 3D analyzer 180 can operate in other environments such as a server or on a device with only general processing capabilities, or in a cloud environment. Even though the network controller 170 and Wi-Fi 3D analyzer 180 are illustrated as separate components in FIG. 2, in some examples, they can be a single device (i.e., the Wi-Fi 3D analyzer 180 is run on the network controller 70 itself) or run in a virtualized cloud environment.

The wireless network 150 comprises APs 102 illustrated in FIG. 1, sensor(s), and user devices. The network controller 170 can include AP database 104, AP model service 106, telemetry service 112, user location service 122, building plan design service 124, building plan import service 126, and building plan layout service 128, all of which are illustrated in FIG. 1. The Wi-Fi 3D analyzer 180 can include visualization service 108, analysis service 114, troubleshooting service 116, optimizations service 118, simulation service 120, and user interface service 130, all of which are also illustrated in FIG. 1.

The wireless network 150 can transmit sensor data 152, assurance data 154, and/or telemetry data 156 to the network controller 170. The network controller 170 can store such received data and can provide user interfaces and APIs for receiving network configurations and updates. Network configurations can be used to provision 158 various devices in wireless network 150. Also, the network controller 170 can transmit live data 172, 3-D maps 174 (e.g., 3-D building plans or floor plans), and/or hardware models 176 to the Wi-Fi 3D analyzer.

The Wi-Fi 3D analyzer 180 can use the 3-D maps 174 and hardware models 176 to generate predictions or simulations of wireless signal propagation and their correlation with the live data 172. Based on the data received from the network controller 170, the Wi-Fi 3-D analyzer 180 can provide wireless 3-D rendering 182, simulation 184, and/or insights 188 to the user 190. For example, the user can be provided with the wireless 3-D rendering 182 of the wireless signal coverage (e.g., RF coverage) and options to run simulations 184 for what-if scenarios, and insights 186 including suggestions for improving the network performance associated with the wireless signal coverage. Based on what is provided by the Wi-Fi 3D analyzer 180, the user 190 can take action 188 accordingly, for example, modifying a network configuration to improve the network performance. Wi-Fi 3D analyzer 180 can forward any updates to the network configuration for provisioning 178 to the network controller 170.

Furthermore, the sales tools 160 can provide a product upgrade management based on the communication flow between the sales tools 160, the network controller 170, and the Wi-Fi 3D analyzer 180. The sales tools 160 can transmit new products and lifecycle data 162 to the network controller 170. Then the network controller 170 forwards the new products and lifecycle data 164 to the Wi-Fi 3D analyzer 180. The new products and lifecycle data 162 and 164 can include new product availability for sale or end-of-life dates for AP products.

Based on the new products and lifecycle data 164, the Wi-Fi 3D analyzer 180 can provide upgrade proposals 166, which can include simulation 184 and insights 186 on product upgrade, to the user 190. Also, in response to the upgrade proposals, the user 190 can place a new product order 168 by utilizing the sales tools 160. For example, the new products and lifecycle data 162 can include end-of-life data associated with a particular AP so that an upgrade or replacement of a new AP can be recommended based on the end-of-life data prior to the expiry of the AP. Also, the user 190 can place an order for a new AP with the sales tools 160.

Figure 3:
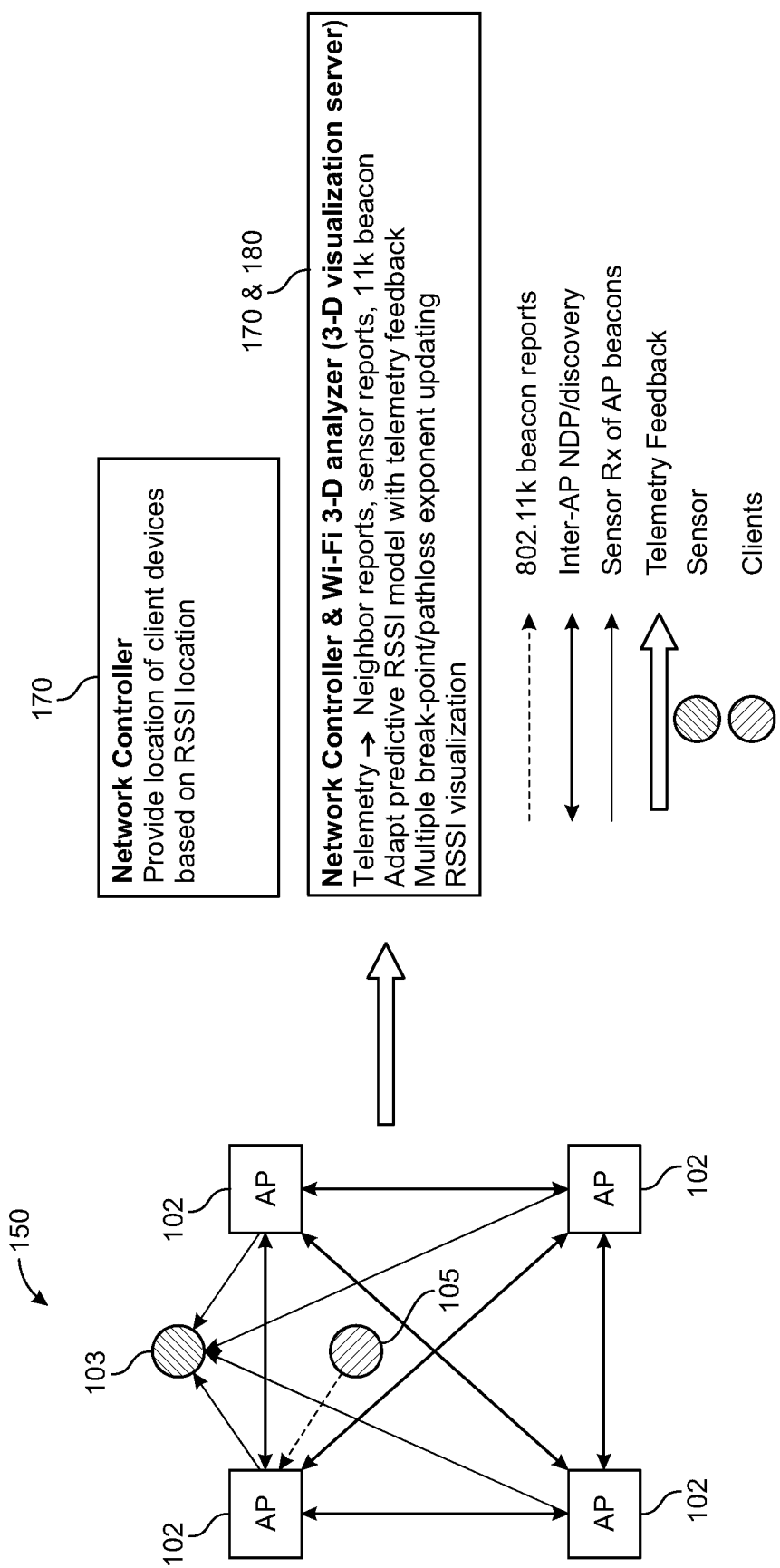
FIG. 3 illustrates an example network architecture diagram of a visualization system for presenting a wireless signal propagation in 3-D according to some aspects of the disclosed technology.

FIG. 3 illustrates an example network architecture diagram for a wireless network 150, a network controller 170, and a Wi-Fi 3-D analyzer 180 according to some aspects of the disclosed technology. The wireless network 150, also illustrated in FIG. 2, comprises APs 102 and sensors 103 and client devices 105.

The wireless network 150 can transmit telemetry feedback (for example, telemetry data 156 illustrated in FIG. 2) to the network controller 170. For example, each AP 102 transmits beacons to the sensor 103 whereby a sensor report can be generated. Also, the APs 102 communicate with each other via inter-AP Neighbor Discovery Protocol (NDP) to generate neighbor reports. Furthermore, client device 105 measures beacons and returns a report with stored beacon information (e.g., 802.11k beacon reports). Based on the neighbor reports, 802.11k beacon reports, and sensor reports, the wireless network 150 provides telemetry feedback to the network controller 170. The telemetry feedback can include information about a distance and azimuth angle between a pair of APs or an AP and a sensor and walls or any obstructions between the pair on a building plan or a floor plan. Also, network controller 170 includes location information of client devices based on RSSI location, which is received from the wireless network 150.

Based on the data provided by the wireless network 150, the network controller 170 and the Wi-Fi 3-D analyzer 180 can determine a predictive RSSI model and visualize the predicted RSSI at all 3-D locations.

Figure 4:
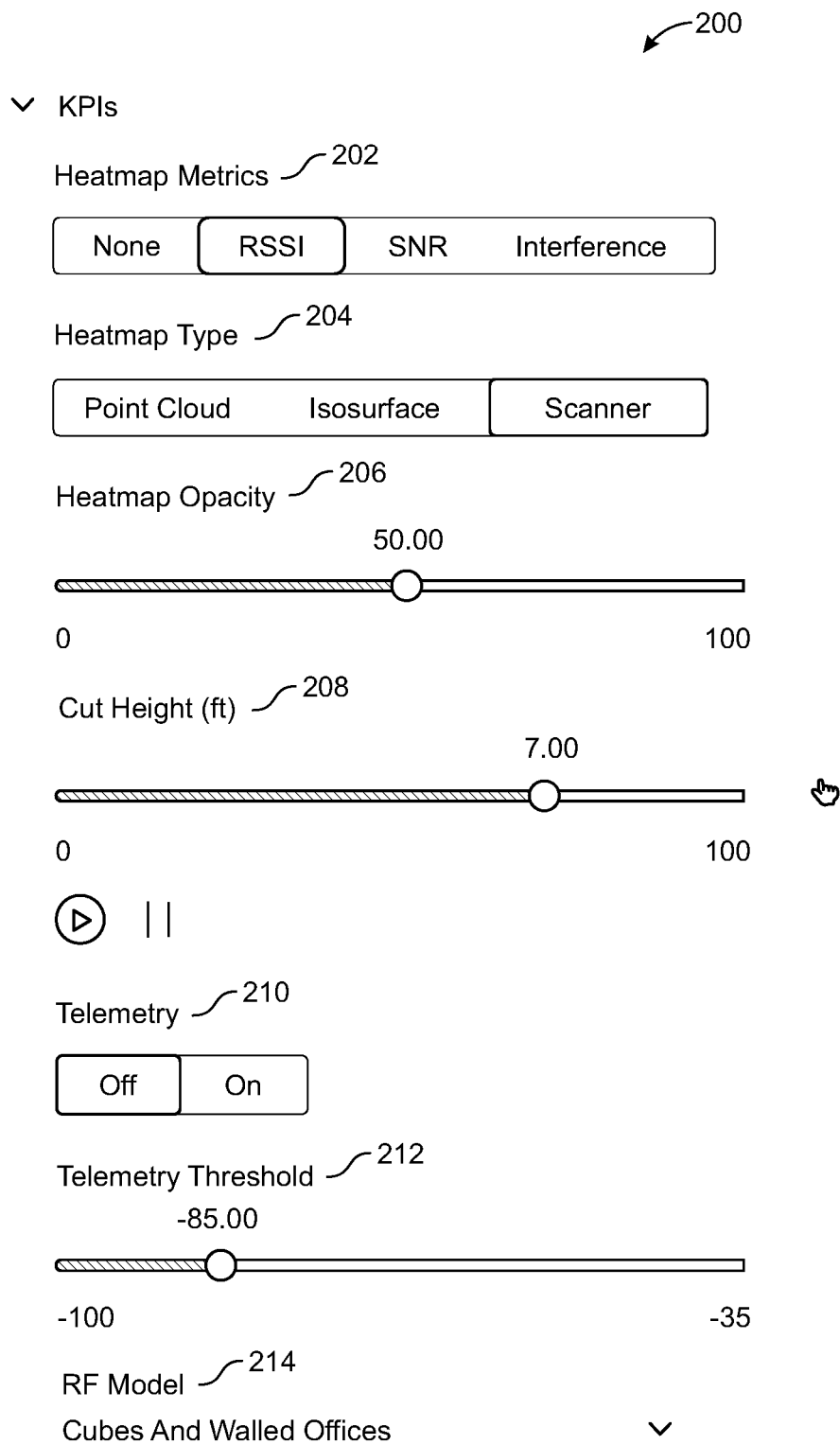
FIG. 4 illustrates an example control menu for a 3-D visualization system according to some aspects of the disclosed technology.

FIG. 4 illustrates an example menu 200 including a list of various parameters that can be adjusted for the 3-D visualization of the wireless signal propagation.

Menu 200 provides an option for key performance indicator (KPI) heatmap metrics 202, for example, none, RSSI, SNR, or Interference. Depending on the selected heatmap metrics, the 3-D visualization of the wireless signal propagation can be presented based on RSSI values, SNR measurements, or interference measurements. RSSI values are a predicted or measured power level at a point in space of an RF transmitted from an AP. SNR measurements are based on the amplitude of signal and noise level. Interference measurements or predictions are based on the power of the interfering signals.

Menu 200 also provides an option for heatmap type 204, for example, point cloud, isosurface, or scanner. A point cloud heatmap provides the 3-D visualization of the wireless signal propagation as a collection of color-coded points where a color variation corresponds to a degree of signal strength. An isosurface heatmap displays the 3-D visualization of the wireless signal propagation with isosurfaces (e.g., contour lines or surfaces) where each isosurface represents points of equal values in a 3-D space. A scanner provides the 3-D visualization of the wireless signal propagation with color-coded bands where the color of the bands correspond to a degree of signal strength. Also, the scanner allows a user to manipulate a height in the 3-D space, for example, via a height manipulation bar under a cut height 208 so that the wireless signal propagation pattern can be scanned through the 3-D space, for example, from a ground to a ceiling and visualized at varying heights.

Furthermore, a heatmap opacity 206 can be adjusted, for example, in a scale of 0 (i.e., non-transparent) to 100 (i.e., fully transparent) to adjust the transparency of the 3-D visualization.

Also, cut height (ft) 208 can be adjusted, for example, in a scale of 0 to 10. A user can select a particular height where the 3-D visualization is desired. Or, with a play button and a pause button, the 3-D visualization of the wireless signal propagation can be simulated at continuously varying heights from 0 ft to 10 ft.

Menu 200 also provides an option where a visualization of telemetry data 210 can be switched on and off. Also, telemetry threshold 212 can be adjusted, for example, in a scale of −100 to −35.

Furthermore, menu 200 provides an option for a RF Model selection 214. For example, a drop-down list provides various options for the RF model such as cubes and walled offices, drywall offices, or open space.

While not shown in FIG. 4, menu 200 can include different or alternative options. For example, menu 200 could include an option for clipping a 3-D floor plan to take cross-sections of the floor plan to allow clear visualization of an area of interest. Menu 200 could include an adjustable noise floor to be used in calculating a signal-to-noise ratio (SNR). Menu 200 could include an option to change the model of AP being visualized to permit comparisons between various hardware options. Menu 200 could include an option to adjust the frequency band from 2.4 GHz to 5 GHz to visualize attributes associated with RF propagation at those frequencies. The 2.4 GHz band typically provides a greater distance of coverage, while the 5 GHz band typically provides faster communication speeds. Menu 200 can include antennae options that might permit visualizations using directional antennas or omnidirectional antennas. Menu 200 could provide options for adjusting transmission power of an antenna, or a channel. Menu 200 could also provide various sliders for visualizing animations such as a time scale. Accordingly, the menu can provide many options that can vary depending on the type of visualization being presented.

Furthermore, menu 200 can be presented as a sidebar menu next to any of the visualizations illustrated in the present disclosure and can be used to change aspects of the visualizations.

Figure 5:
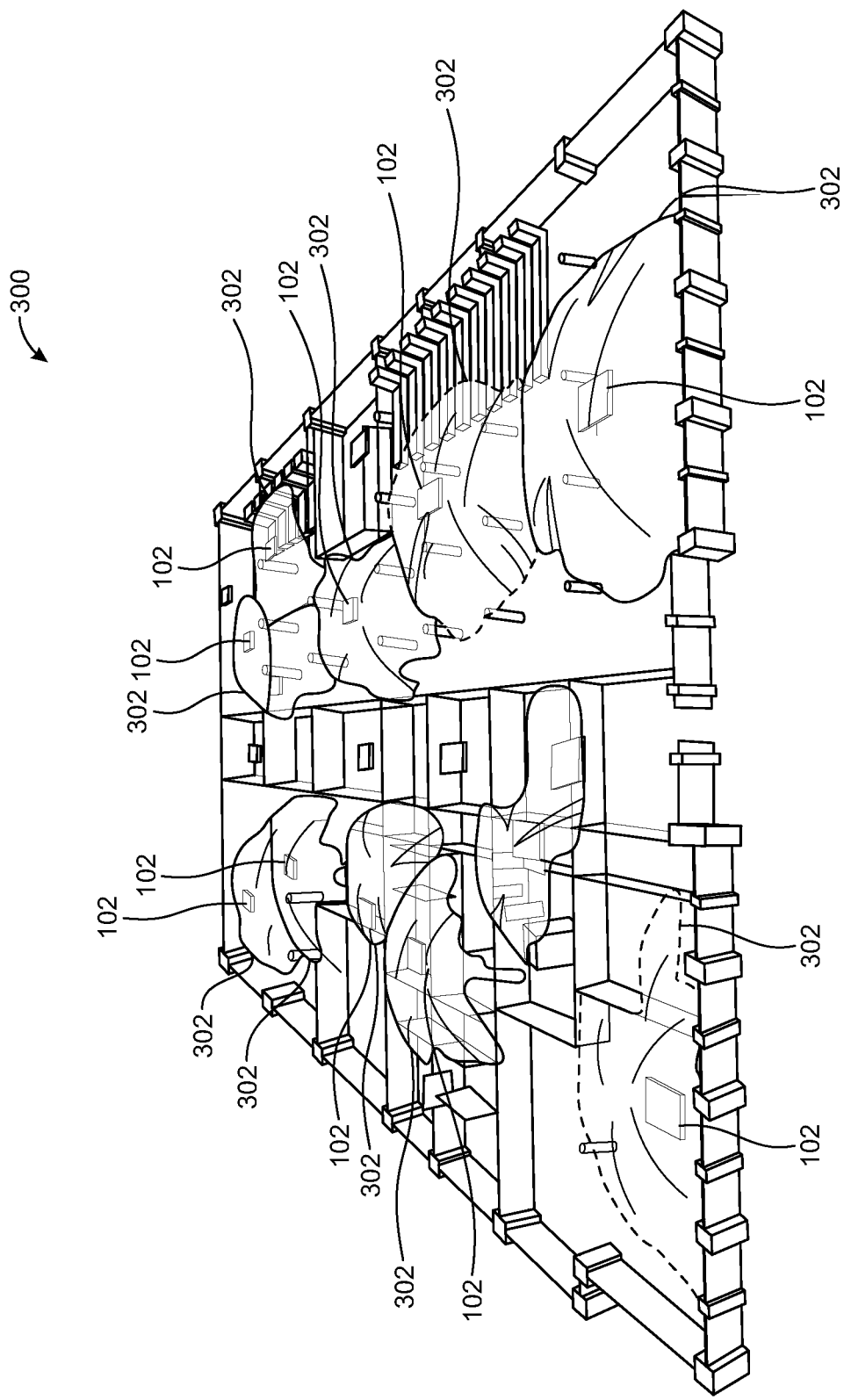
FIG. 5 illustrates an example 3-D visualization of a wireless signal propagation based on a key performance indicator (KPI) according to some aspects of the disclosed technology.

FIG. 5 illustrates an example 3-D visualization 300 of Wi-Fi AP RF signal propagation. In the 3-D visualization 300, the 3-D visualization of a building plan (e.g., floor plan) is overlaid with RF propagation patterns. As shown in FIG. 5, the 3-D visualization 300 illustrates the RF signal propagation patterns as a collection of zones 302 where each zone represents a service area covered by each AP 102 (e.g., AP 102 illustrated in FIG. 1). Each zone is in the shape of a dome to illustrate a signal strength in the service area in 3-D instead of a simple flat layer in 2-D. Furthermore, the color and size of the domes correspond to a degree of signal strength from the AP in the service area. The dome shape acknowledges that the RF propagation from an AP is not uniform at all heights of a floor plan.

Even though the 3-D visualization 300 of Wi-Fi AP RF signal propagation in FIG. 5 uses a color-coded dome model, the 3-D visualization of the RF signal propagation according to the present disclosure can be provided in the form of a point cloud model, a heat map, or a contour map to illustrate the degree of signal strength in the 3-D space.

Figure 6:
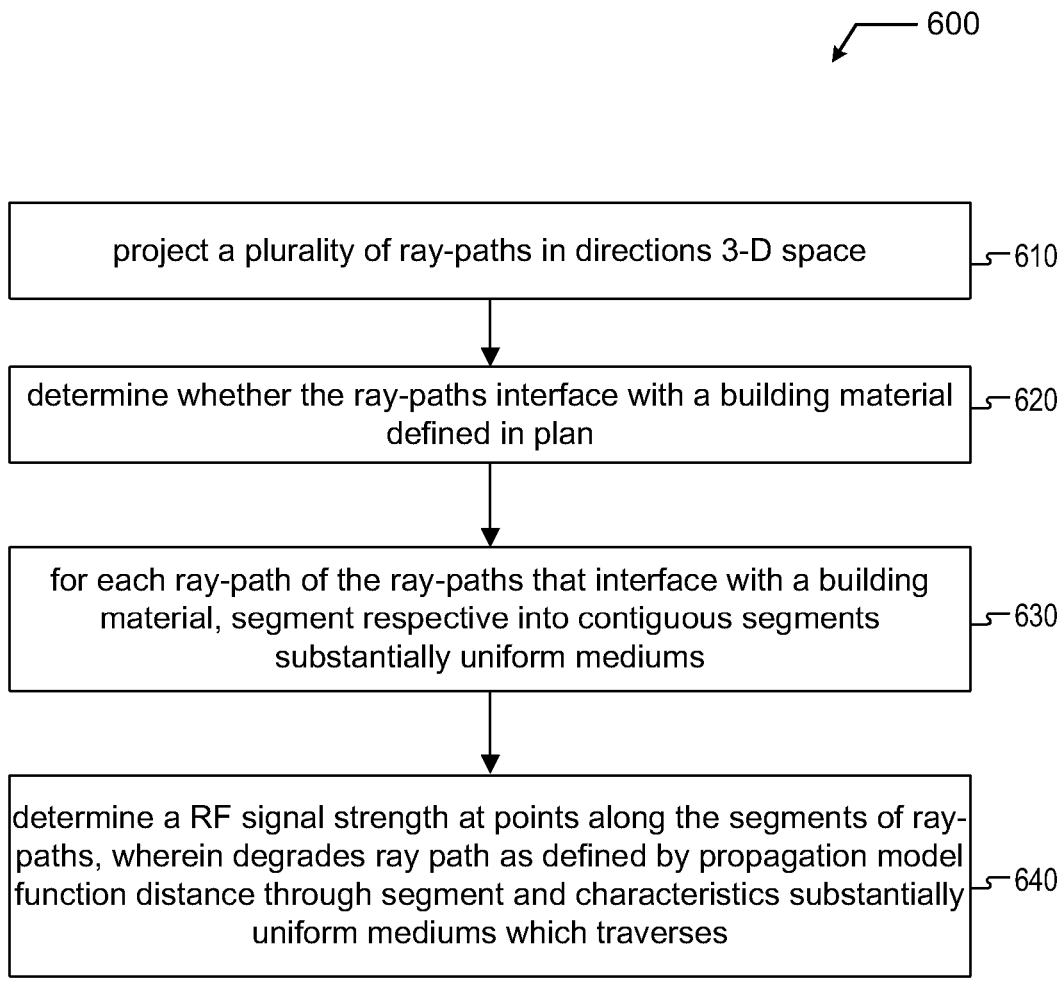
FIG. 6 illustrates a flowchart of an example method for determining a radio frequency (RF) signal strength at points distributed in 3-D space according to some examples of the present disclosure.

FIG. 6 illustrates an example method 600 for determining an RF signal strength at points distributed in 3-D space. In some examples, method 600 for calculating the 3-D RF propagation pattern can be included as part of method 700 or method 800 as described below with respect to FIGS. 7 and 8. Method 600 includes projecting a plurality of ray-paths in a plurality of directions in 3-D space at block 610. For example, the ray tracing service 110 illustrated in FIG. 1 may project a plurality of ray-paths in a plurality of directions in 3-D space. In some embodiments, the ray-paths originate from the Wi-Fi AP and emanate in a variety of X, Y, and Z planes.

Method 600 includes determining whether the ray-paths interface with a building material defined in a building plan at block 620. For example, the ray tracing service 110 illustrated in FIG. 1 may determine whether the ray-paths interface with a building material defined in a building plan.

Method 600 includes segmenting each ray-path of the ray-paths that interface with a building material the respective ray-path into contiguous segments of substantially uniform mediums at block 630. For example, the ray tracing service 110 illustrated in FIG. 1 may segment the respective ray-path into contiguous segments of substantially uniform mediums.

The ray tracing service 110 can provide the segmented ray paths to an AP model service 106. The combination of the collection of ray paths for any AP and model information from AP model service 106 can be provided to visualization service 108.

Method 600 includes determining a RF signal strength at points along the segments of the ray-paths at block 640. For example, the visualization service 108 illustrated in FIG. 1 may determine a RF signal strength at points along the segments of the ray-paths. The visualization service 108 can use the information about the collection of ray paths for any AP and a RF propagation model particular to the type of AP and the parameters for the specification AP to determine the RF signal strength at points along the segments of the ray-paths. In some embodiments, the signal degrades along the ray path as defined by the RF propagation model as a function of distance through the segment and characteristics of RF propagation through the substantially uniform mediums through which the segment traverses.

Figure 7:
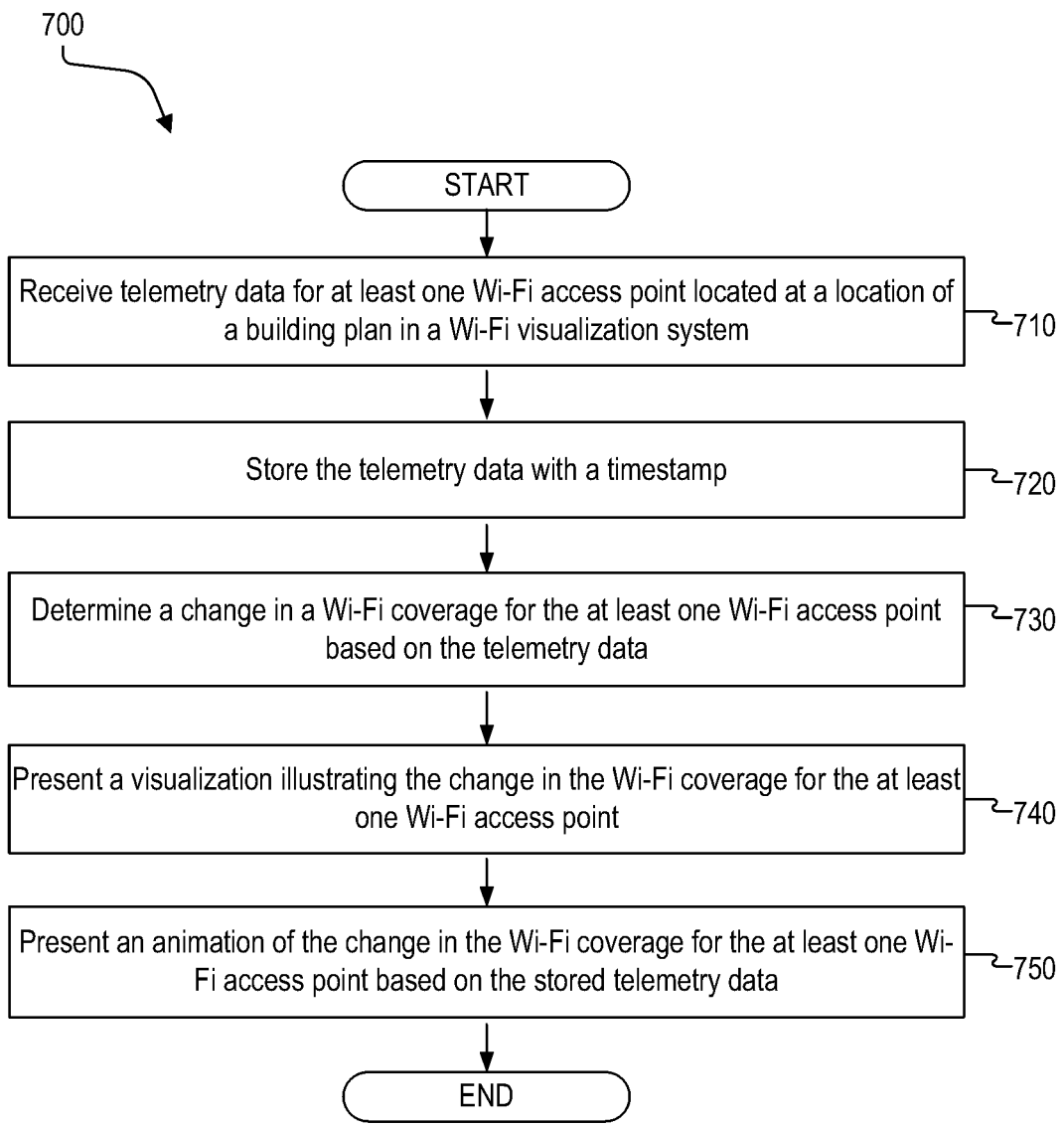
FIG. 7 illustrates a flowchart of an example method for visualizing a Wi-Fi AP RF propagation pattern based on telemetry data according to some aspects of the disclosed technology.

FIG. 7 illustrates an example method 700 for visualizing a Wi-Fi AP RF propagation pattern based on telemetry data. Although the example method 700 depicts a particular sequence of operations, the sequence may be altered without departing from the scope of the present disclosure. For example, some of the operations depicted may be performed in parallel or in a different sequence that does not materially affect the function of method 700. In other examples, different components of an example device or system that implements method 700 may perform functions at substantially the same time or in a specific sequence.

According to some examples, method 700 includes receiving telemetry data for at least one Wi-Fi AP located at a location of a building plan in a Wi-Fi visualization system at block 710. For example, the telemetry service 112 illustrated in FIG. 1 may receive telemetry data for at least one Wi-Fi AP located at a location of a building plan in a Wi-Fi visualization system.

In some examples, the telemetry data is received in substantially real-time (e.g., for every N second) to provide accurate and reliable information and measurements of dynamic networking environments. Based on the real-time telemetry data, also so-called live telemetry data, instead of relying on plotted data sets, the Wi-Fi visualization system (e.g., 3-D signal propagation visualization system 100 illustrated in FIG. 1) can provide an accurate visualization of how the Wi-Fi network is performing including dynamic network events in action in the network.

In some examples, the telemetry data includes a dynamic channel assignment, dynamic frequency selection (DFS), channel loads, co-channel interference, signal-to-noise ratio (SNR), or transmission power level adjustment.

In some examples, when the telemetry data includes the SNR, method 700 further includes determining that the SNR is greater than a threshold and visually identifying an area of the building plan where the SNR is greater than the threshold, whereby a user can determine whether a radio resource management (RRM) algorithm is operating properly (e.g., whether the RRM algorithm is correctly reacting to increased interference).

In some examples, the telemetry data is received from various sources such as sensors, Wi-Fi APs, or client devices located in the building plan. For example, the telemetry data can be received as a result of inter-AP or AP-to-sensor exchanges.

In some instances, the transmission of the telemetry data is based on an RRM algorithm. In some examples, the network controller 170 illustrated in FIG. 1 executes the RRM algorithm that contains dynamics and configuration changes in the Wi-Fi network (e.g., co-channel interference, radio resources, and other radio transmission characteristics in the Wi-Fi network). The RRM algorithm enables the transmission of a message from every AP to every other AP so that the telemetry data can be updated constantly, thereby providing more accurate and reliable measurements and information of the Wi-Fi network.

According to some examples, method 700 includes storing the telemetry data with a timestamp at block 720. For example, the telemetry service 112 illustrated in FIG. 1 may store the telemetry data with a timestamp.

According to some examples, method 700 includes determining a change in Wi-Fi coverage for the at least one Wi-Fi AP based on the telemetry data at block 730. For example, the telemetry service 112 illustrated in FIG. 1 may utilize the telemetry data to determine a change in Wi-Fi coverage for the at least one Wi-Fi AP. More specifically, in determining the change in the Wi-Fi coverage, the telemetry service 112 illustrated in FIG. 1 can utilize the telemetry data such as dynamic channel assignments, transmission power level adjustment, SNR measurements, channel loads (e.g., channel interference), client density, co-channel interference, etc.

According to some examples, method 700 includes presenting a visualization illustrating the change in the Wi-Fi coverage for the at least one Wi-Fi AP at block 740. For example, the visualization service 108 illustrated in FIG. 1 may present a visualization illustrating the change in the Wi-Fi coverage for the at least one Wi-Fi AP. Examples of visualizations illustrating the change in the Wi-Fi coverage are shown in FIG. 9-11.

Figure 9:
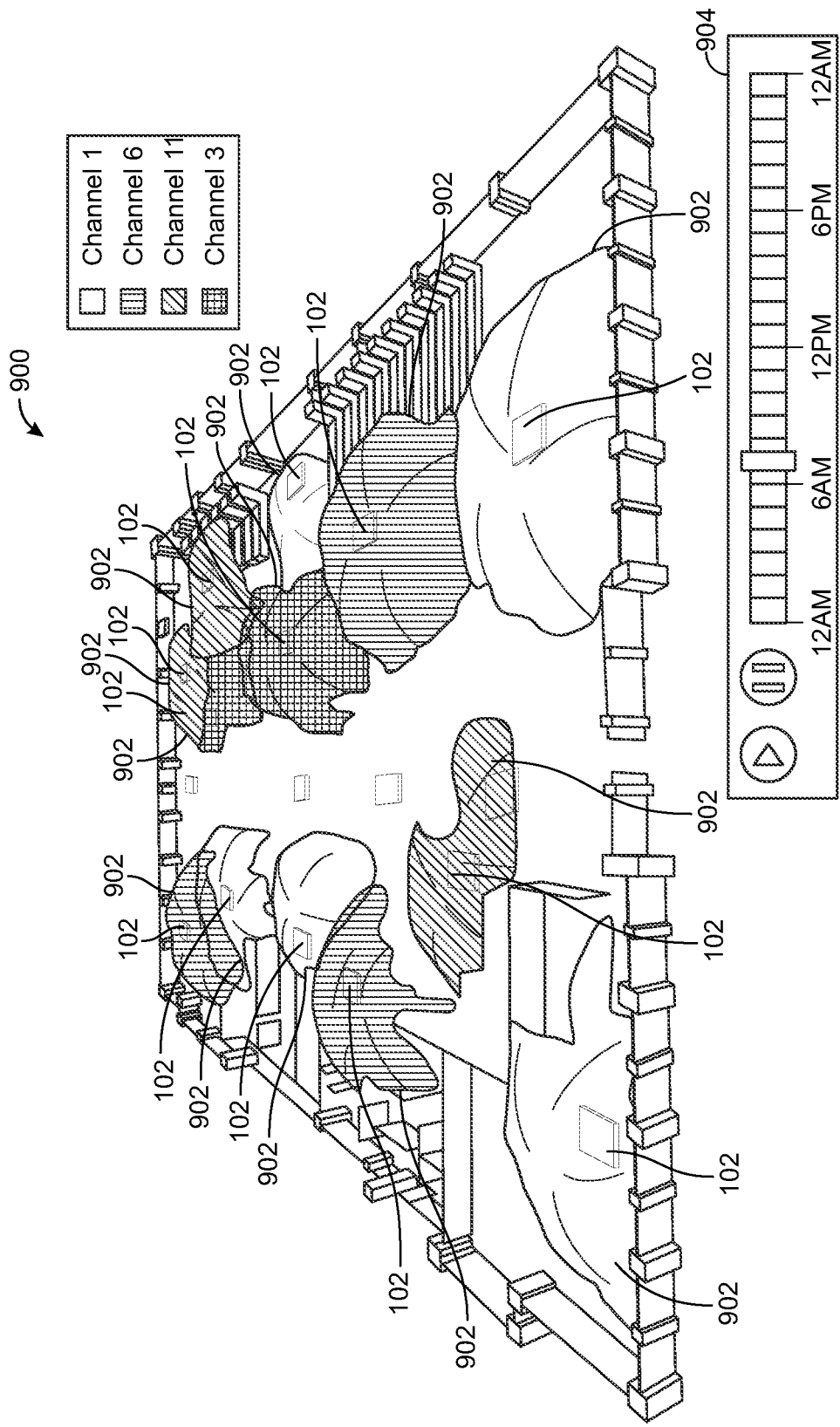
FIG. 9 illustrates an example 3-D visualization of a wireless signal propagation showing a channel assignment according to some aspects of the disclosed technology.

Referring to FIG. 9, it illustrates an example 3-D visualization 900 of a wireless signal propagation based on transmission power including a channel assignment. Similar to FIG. 5, the 3-D visualization 900 illustrates the RF signal propagation pattern (i.e., Wi-Fi coverage) as a collection of AP zones 902 per each AP 102. In some examples, each zone (i.e., bubble) is in the shape of a dome to illustrate the transmission power level. The greater the area encompassed by the dome, the higher the level of the transmission power in the zone. The color of each cell indicates the channel assignment (i.e., a channel where each AP is assigned to), for example, channel 1, channel 6, channel 11, or channel 3.

In some examples, the 3-D visualization 900 in FIG. 9 can be presented over a time scale, whereby a user may observe as Wi-Fi access point channels change, channels interfere with each other, and how Wi-Fi coverage is ultimately affected by the change in channels over time.

Figure 10:
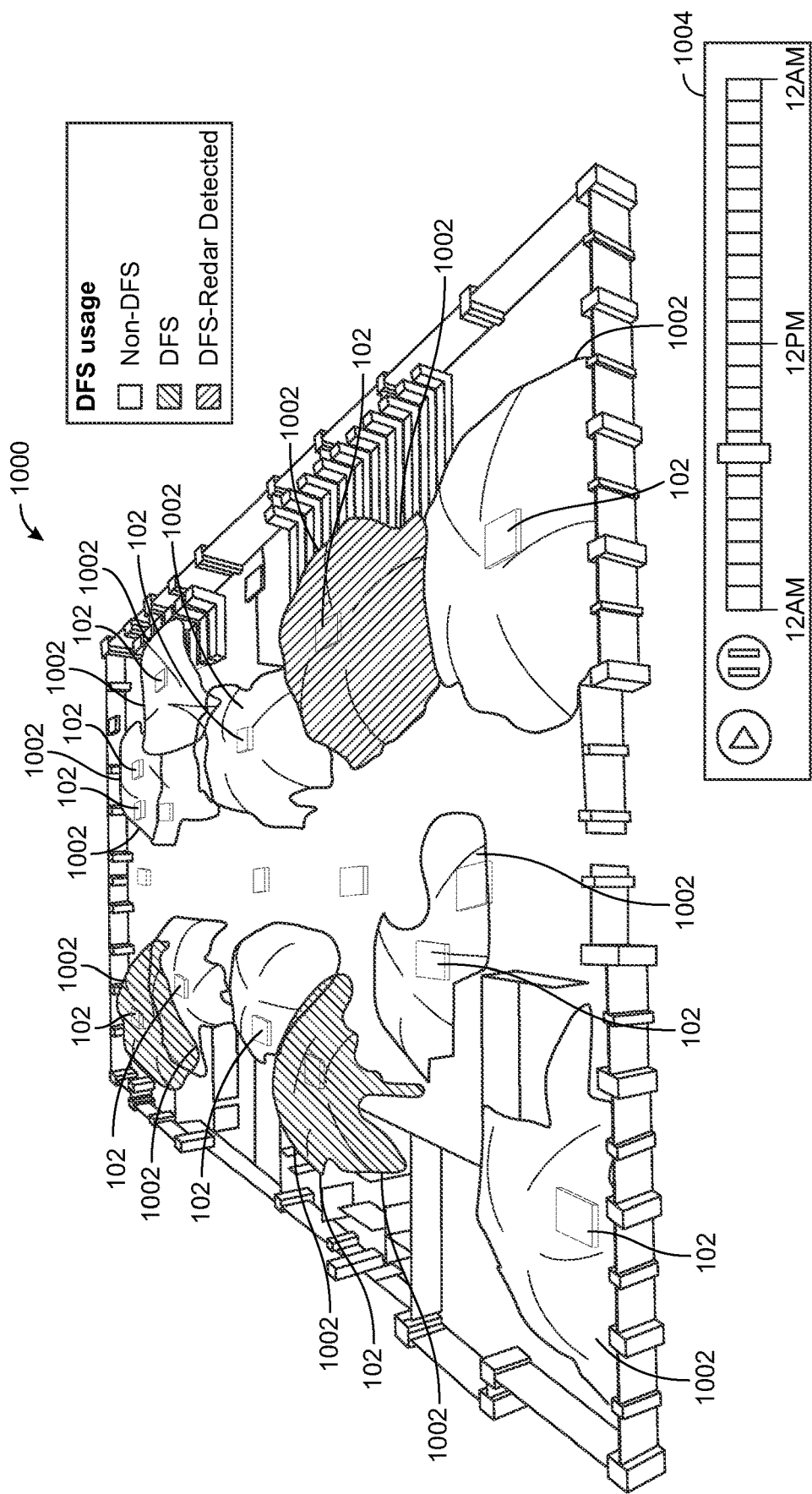
FIG. 10 illustrates an example 3-D visualization of a wireless signal propagation showing 5 GHz dynamic frequency selection (DFS) channel allocation according to some aspects of the disclosed technology.
Figure 11:
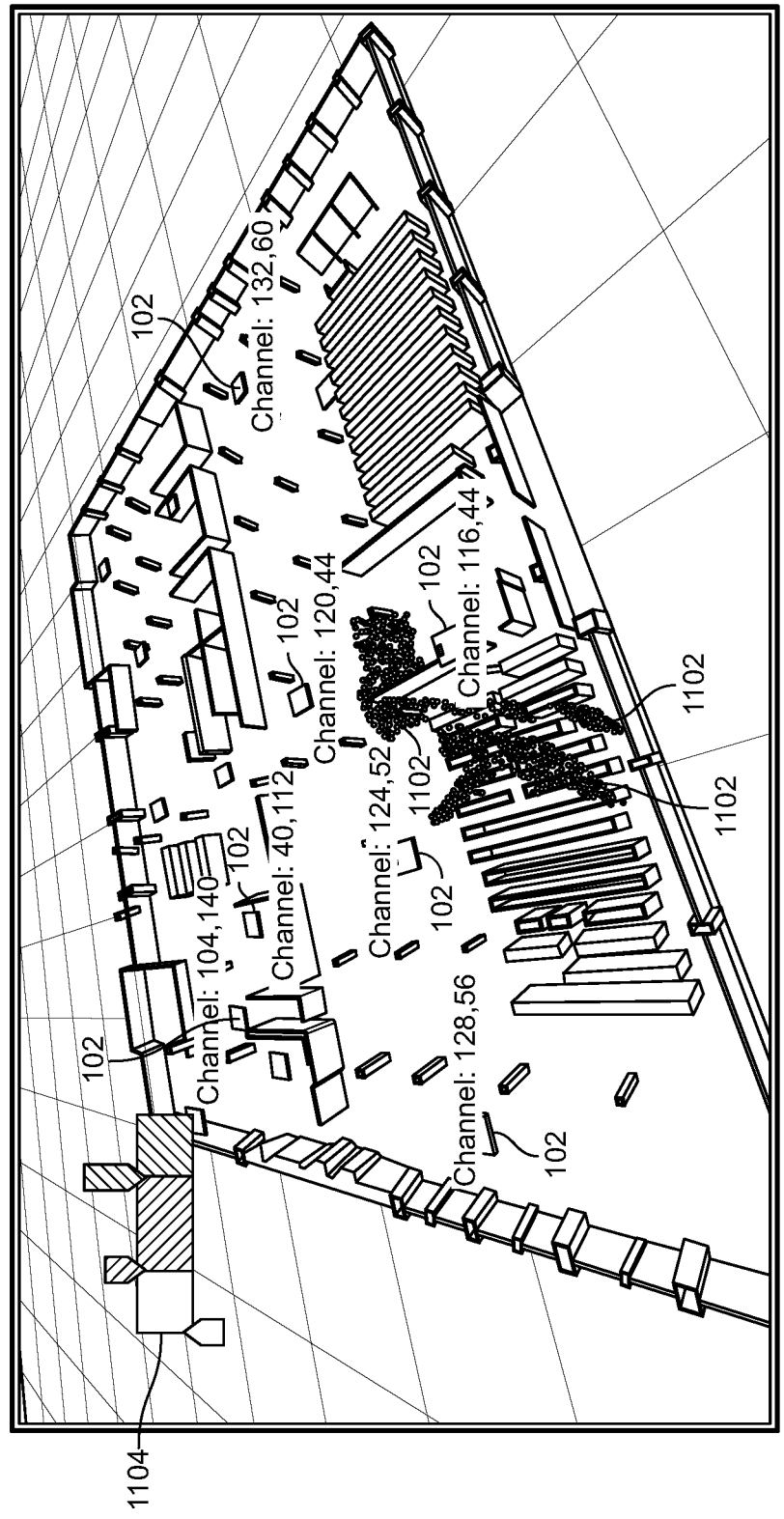
FIG. 11 illustrates a 3-D visualization of a wireless network including the impact of interference in the Wi-Fi network according to some aspects of the disclosed technology.

Referring to FIG. 10, a 3-D visualization 1000 of a wireless signal propagation showing 5 GHz DFS channel allocation is illustrated in FIG. 10. Each AP zone 1002 for each AP 102 can illustrate its DFS usage, for example, "Non-DFS," "DFS," or "DFS—Radar Detected" via a different color, pattern, etc. If DFS is enabled (e.g., "DFS"), an AP can determine if channel congestion is occurring and once congestion is detected, it can move its client devices over to an unused channel for better performance (i.e., DFS can detect interference and moves the wireless network to another frequency with no interference.) If an AP uses a DFS channel and detects a radar signal (e.g., "DFS—Radar Detected"), the AP frees up the channel to avoid the channel used by the radar and switches to another channel. Therefore, the 3-D visualization 1000 showing 5 GHz DFS channel allocation help understanding the network performance for each AP zone as DFS can provide increased performance, especially where multiple neighboring WI-Fi APs are present, with increased availability of channels (i.e., less probability of interference between neighboring APs).

Referring to FIG. 11, it illustrates a 3-D visualization 1100 including the impact of interference in the Wi-Fi network. In the 3-D visualization 1100, each AP 102 is labeled with a channel that it is broadcasting. In some examples, the 3-D visualization 1000 includes a collection of point clouds to show interference, and in particular, an amount of interference in a different color, pattern, shape, etc. In some instances, the 3-D visualization 1100 can highlight APs that are causing the interference, areas that are impacted by the interference, and interfering channels so that a solution to resolve the issue of interference can be easily derived (e.g., modifying configurations of the AP to change the channel). For example, in the 3-D visualization 1100, two APs that are assigned to channel: 120, 44 and channel: 116, 33 can be identified as a cause of the high interference shown in point clouds. The colors of the point clouds can be adjusted, and which points in the point cloud can be filtered based on the amount of interference using the slider 1104.

In some examples, the presenting the visualization illustrating the change in the Wi-Fi coverage includes presenting a RF propagation pattern in 3-D for the at least one Wi-Fi AP. Detailed information of determining an RF propagation pattern is described above with respect to FIG. 6 where method 600 for calculating the RF propagation pattern is illustrated.

According to some examples, method 700 further comprises presenting the change in the Wi-Fi coverage for the at least one Wi-Fi AP and persisting the presented change in the visualization according to a decay factor. In some examples, the presented change in the Wi-Fi coverage in the visualization decays for some time after. In some instances, the change in the Wi-Fi coverage is presented in the visualization and continued to be presented until another change occurs. For example, the visualization service 108 illustrated in FIG. 1 may persist the presented change in the visualization according to a decay factor. In some examples, the decay factor expires when another change in the Wi-Fi coverage occurs.

In another example of the presenting a visualization illustrating the change in the Wi-Fi coverage at block 740, the visualization can visually identify or highlight an AP that changes its channel due to various events such as DFS usage, high interference, spikes in channel loads, increased noise levels, or increase in client density. The AP can be visually identified as an origin in the visualization. Other APs that are triggered to change due to the change of the origin can also be visually identified in the visualization.

For example, method 700 comprises visually identifying the at least one Wi-Fi AP that is an origin for the change in the Wi-Fi coverage with a first identification. For example, the visualization service 108 illustrated in FIG. 1 may visually identify the at least one Wi-Fi AP that is an origin for the change in the Wi-Fi coverage with a first identification.

Further, method 700 comprises visually identifying a second Wi-Fi AP with a second identification. For example, the visualization service 108 illustrated in FIG. 1 may visually identify a second Wi-Fi AP with a second identification. In some examples, a change in Wi-Fi coverage for the second Wi-Fi AP is a result of the change in the Wi-Fi coverage for the at least one Wi-Fi AP that is the origin for the change in the Wi-Fi coverage.

According to some examples, method 700 includes presenting an animation of the change in the Wi-Fi coverage for the at least one Wi-Fi AP based on the stored telemetry data at block 750. For example, the visualization service 108 illustrated in FIG. 1 can present an animation of the change in the Wi-Fi coverage for the at least one Wi-Fi AP based on the stored telemetry data. The animation can display the visualization of the change in the Wi-Fi coverage continuously in a sequential order to provide a better understanding of the dynamic network environment.

In some examples, the animation of the change in the Wi-Fi coverage includes a time slider (e.g., the time slider 904 or 1004 illustrated in FIGS. 9 and 10) to facilitate manipulation of a time axis associated with the timestamp for the telemetry data to visualize the change in the Wi-Fi coverage for the at least one Wi-Fi AP at times corresponding to the timestamp at block 750. For example, the visualization service 108 illustrated in FIG. 1 may present the animation with a time slider to facilitate manipulation of a time axis associated with the timestamp for the telemetry data to visualize the change in the Wi-Fi coverage for the at least one Wi-Fi AP at times corresponding to the timestamp.

In some examples, the time slider 904 or 1004 illustrated in FIGS. 9 and 10 includes playback buttons that are effective to play and pause the animation.

In some instances, the time slider 904 or 1004 illustrated in FIGS. 9 and 10 allows a user to scroll through the time axis associated with the timestamp so that the user can select a particular timestamp to view the network performance at the selected timestamp.

In some examples, when the animation of the change in the Wi-Fi coverage includes a 5 GHz DFS channel allocation and the change in the Wi-Fi coverage at times corresponding to the timestamp is a change in use of a DFS channel, method 700 further includes automatically identifying a time in which a periodic change in use of the DFS channel occurs.

Figure 8:
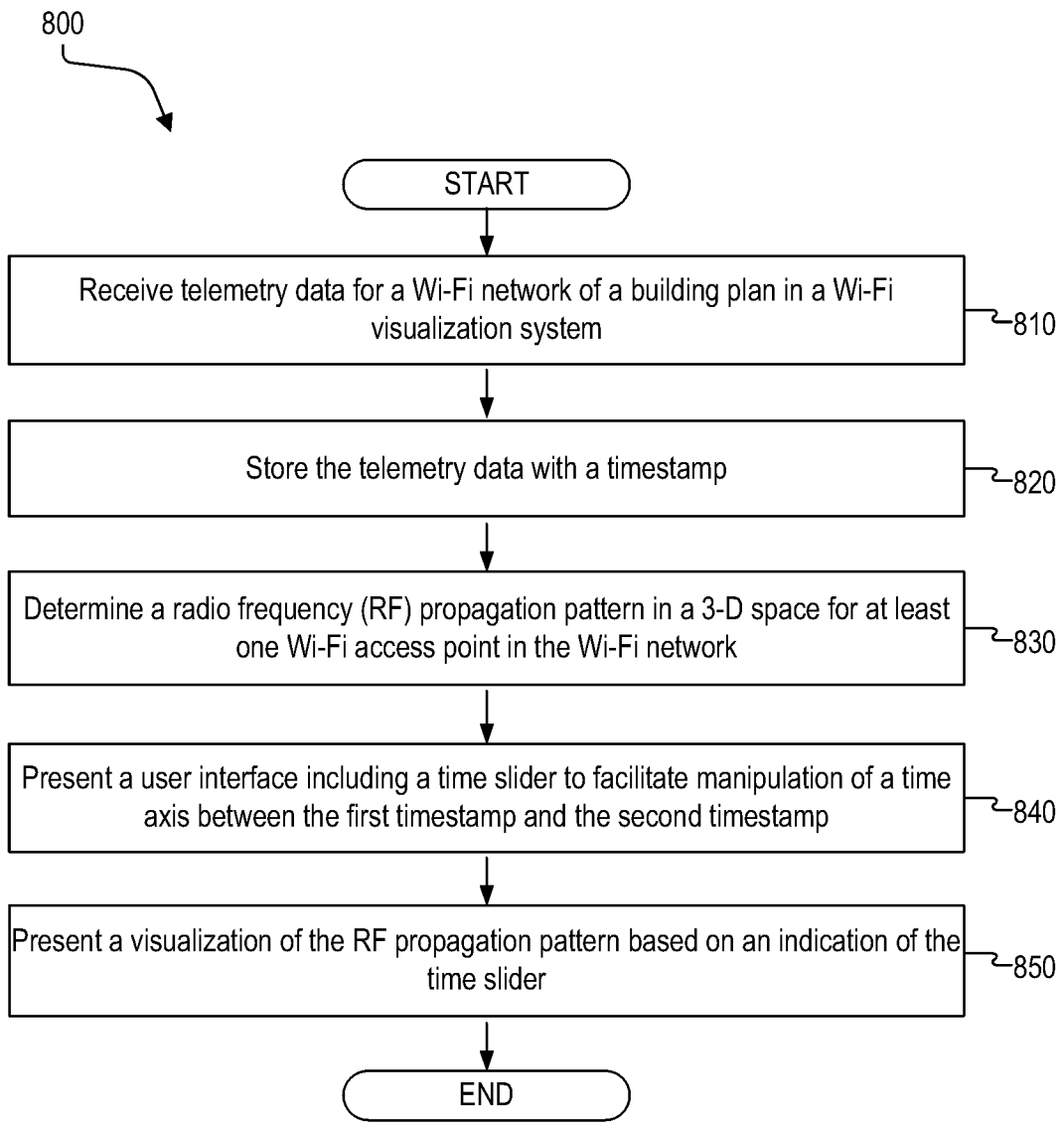
FIG. 8 illustrates a flowchart of an example method for visualizing a Wi-Fi AP RF propagation pattern based on recorded telemetry data over time according to some aspects of the disclosed technology.

FIG. 8 illustrates an example method 800 for visualizing a Wi-Fi AP RF propagation pattern based on recorded telemetry data over time. Although the example method 800 depicts a particular sequence of operations, the sequence may be altered without departing from the scope of the present disclosure. For example, some of the operations depicted may be performed in parallel or in a different sequence that does not materially affect the function of method 800. In other examples, different components of an example device or system that implements method 800 may perform functions at substantially the same time or in a specific sequence.

According to some examples, method 800 includes receiving telemetry data for a Wi-Fi network of a building plan in a Wi-Fi visualization system at block 810. For example, the telemetry service 112 illustrated in FIG. 1 may receive telemetry data for a Wi-Fi network of a building plan in a Wi-Fi visualization system.

In some examples, the telemetry data includes location data for one or more client devices connected to the at least one Wi-Fi AP (i.e., client density), signal strength from each of the at least one Wi-Fi AP, or interference with the RF propagation pattern within the 3-D space.

In some examples, the telemetry data is received from a device in the Wi-Fi network such as a client device, sensors, or other APs.

According to some examples, method 800 includes storing the telemetry data with a timestamp at block 820. For example, the telemetry service 112 illustrated in FIG. 1 may store the telemetry data with a timestamp.

According to some examples, method 800 includes determining a RF propagation pattern (e.g., a Wi-Fi coverage) in 3-D space for at least one Wi-Fi AP in the Wi-Fi network at block 830. Detailed information of determining an RF propagation pattern is described above with respect to FIG. 6 where method 600 for calculating the RF propagation pattern is addressed.

In some instances, the at least one Wi-Fi AP is a plurality of Wi-Fi APs in the Wi-Fi network of the building plan.

In some examples, a first RF propagation pattern is determined at a first timestamp based on the stored telemetry data and a second RF propagation pattern is determined at a second timestamp based on the stored telemetry data.

In some examples, the telemetry data in determining the RF propagation pattern for the at least one Wi-Fi AP includes signal-to-noise ratio measurements, latency measurements, a number of client devices at each of the at least one Wi-Fi AP (e.g., client density), or frequency or transmission power of the at least one Wi-Fi AP.

According to some examples, method 800 includes presenting a user interface including a time slider to facilitate manipulation of a time axis between the first timestamp and the second timestamp at block 840. For example, the visualization service 108 illustrated in FIG. 1 may present a user interface including a time slider to facilitate manipulation of a time axis between the first timestamp and the second timestamp.

According to some examples, method 800 includes presenting a visualization of the RF propagation pattern based on an indication of the time slider at block 850. For example, the visualization service 108 illustrated in FIG. 1 may present a visualization of the RF propagation pattern based on an indication of the time slider. For example, a visualization of the first RF propagation pattern is presented when the time slider indicates the first timestamp. Also, a visualization of the second RF propagation pattern is presented when the time slider indicates the second timestamp.

Referring to FIGS. 12A-12D, various 3-D visualizations of a RF propagation pattern at different times are illustrated in FIGS. 12A-12D.

Figure 12A:
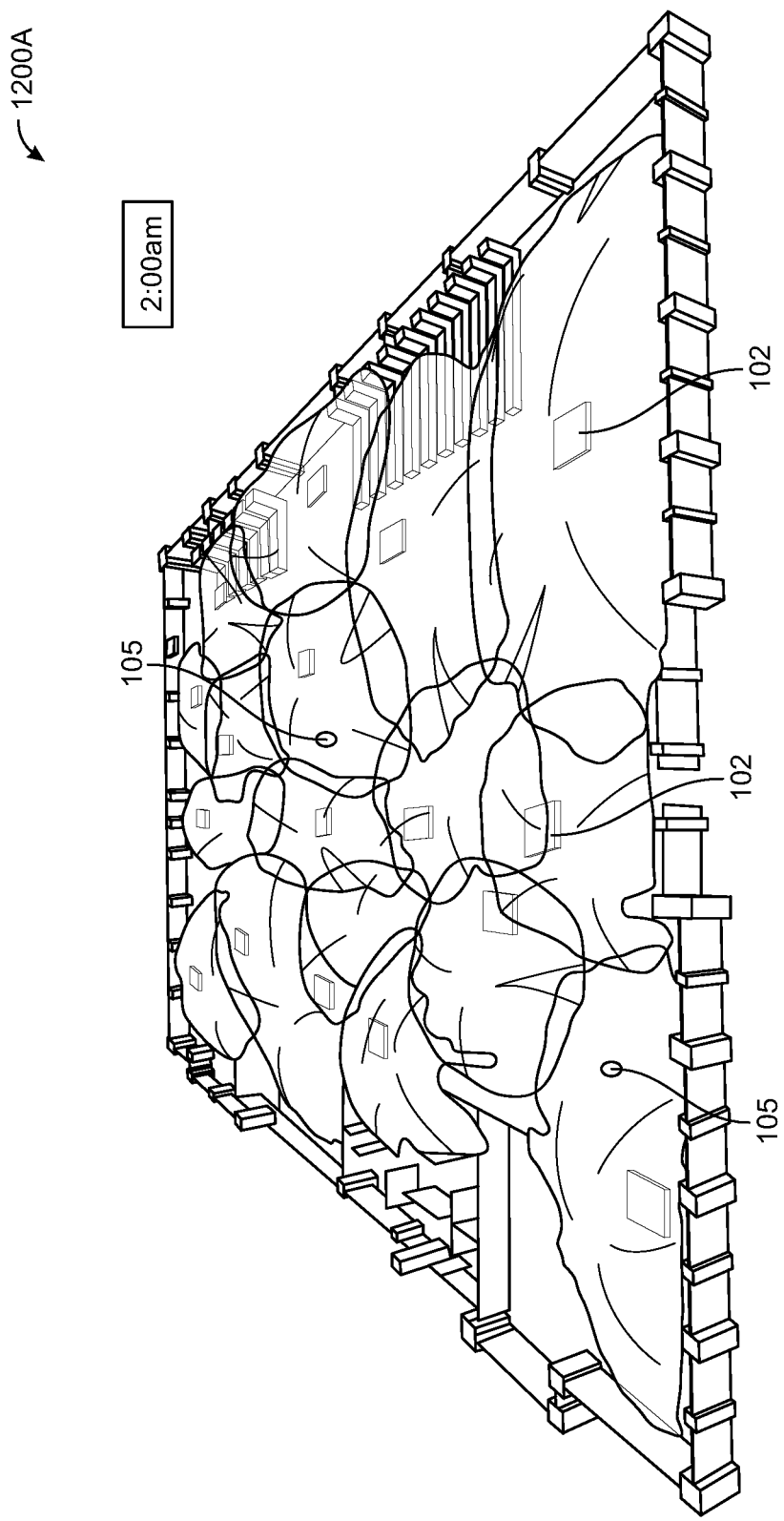
FIGS. 12A-12D illustrate example 3-D visualizations of a wireless signal propagation at different times according to some aspects of the disclosed technology.
Figure 12B:
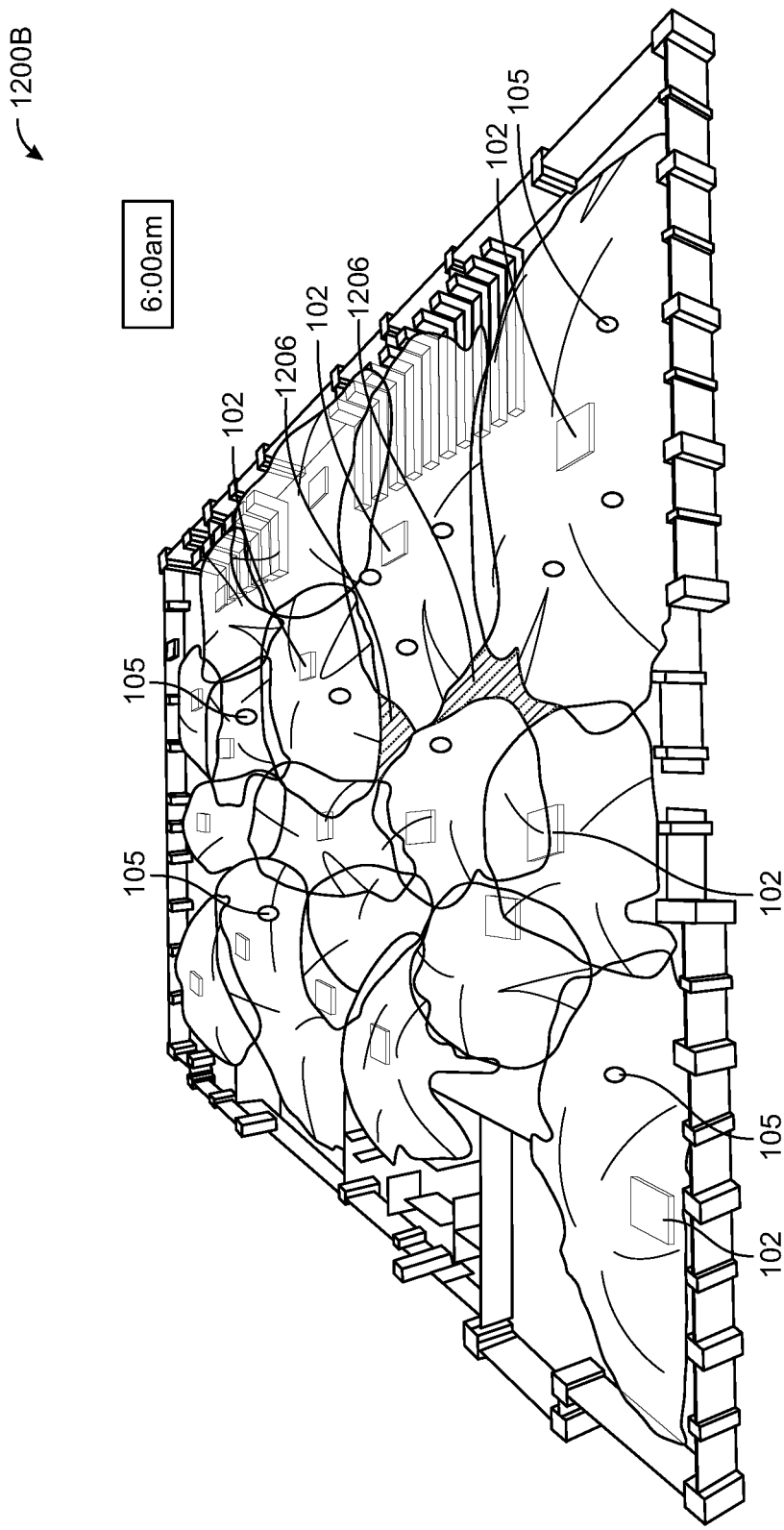
Figure 12C:
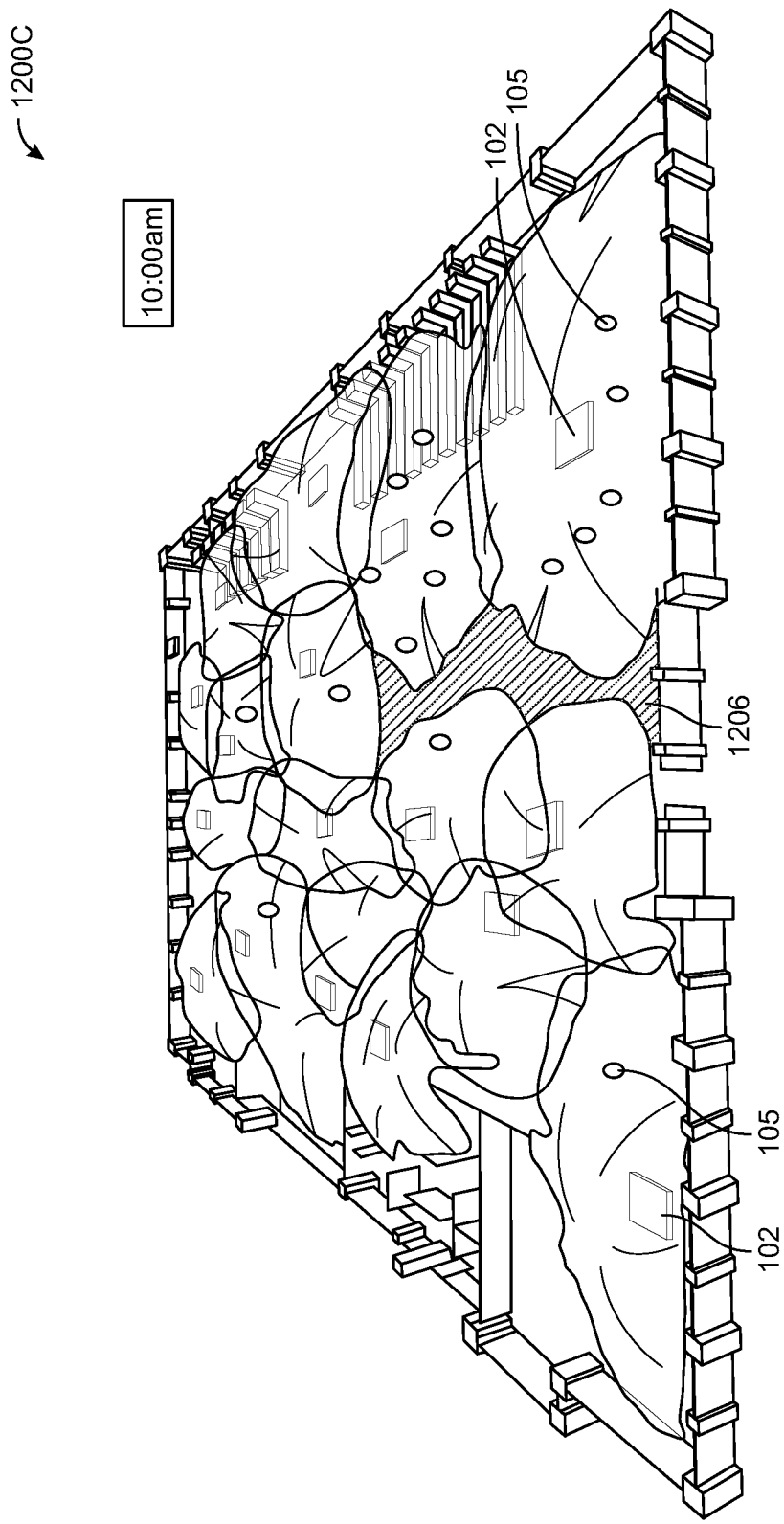
Figure 12D:
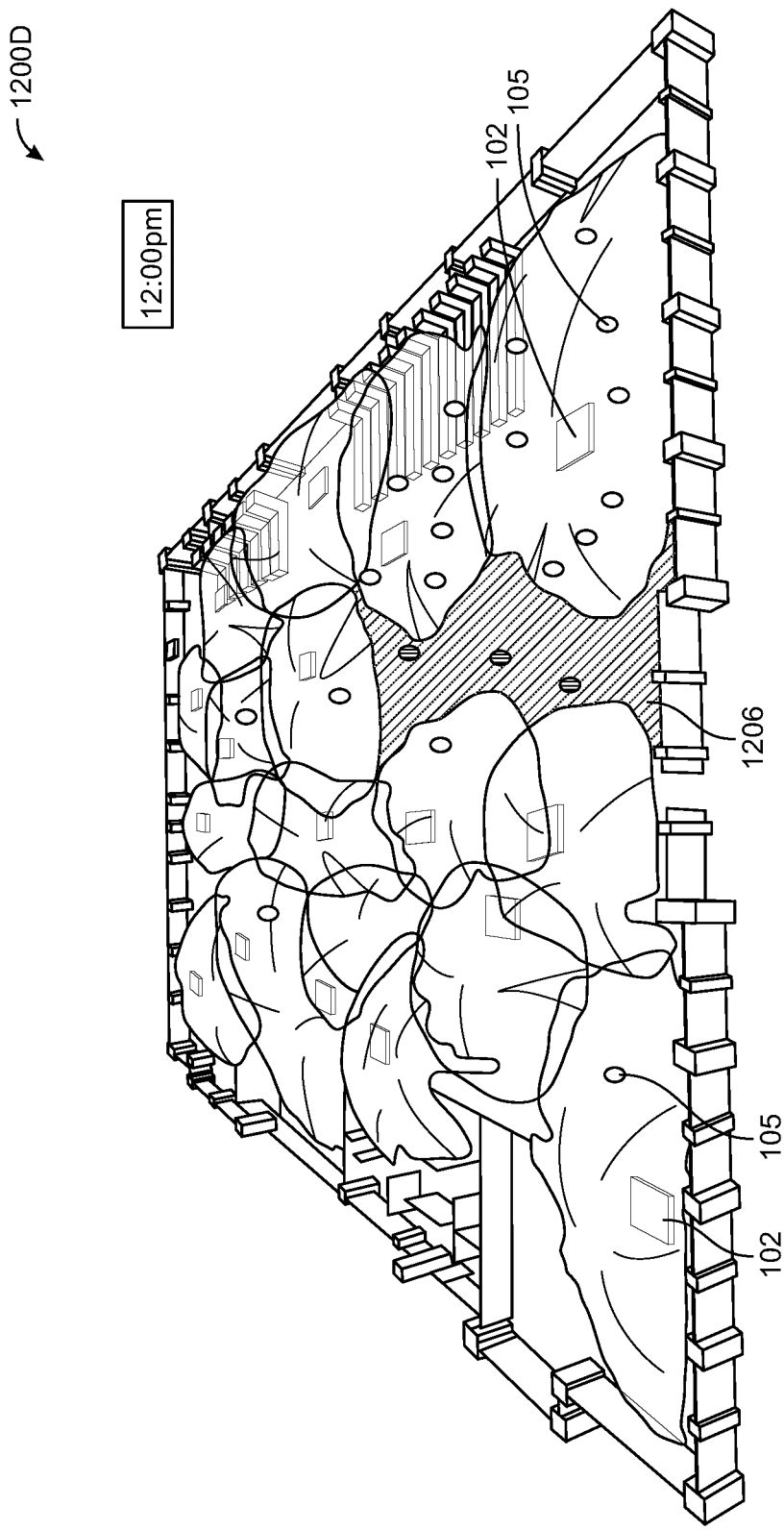

As shown in FIGS. 12A-12D, the 3-D visualizations 1200A-1200D of the RF propagation patterns including the impact of interference over time can be shown. For example, as the time progresses from 2:00 am in FIG. 12A to 12:00 pm in FIG. 12D, an area impacted by the interference 1206 in FIGS. 12B-12D shows the amount of interference at different times so that the network performance depending on the time of the day can be analyzed based on the provided information (e.g., the impact of interference in time).

Furthermore, in some instances, the 3-D visualizations of the RF propagation pattern 1200A-1200D visually identify client devices 105 associated with the APs 102. As illustrated in FIG. 12D, client devices 105 in the area impacted by the interference 1206 are marked differently (e.g., with patterns or in a different color) to note the client devices that are affected by the interference.

Figure 13:
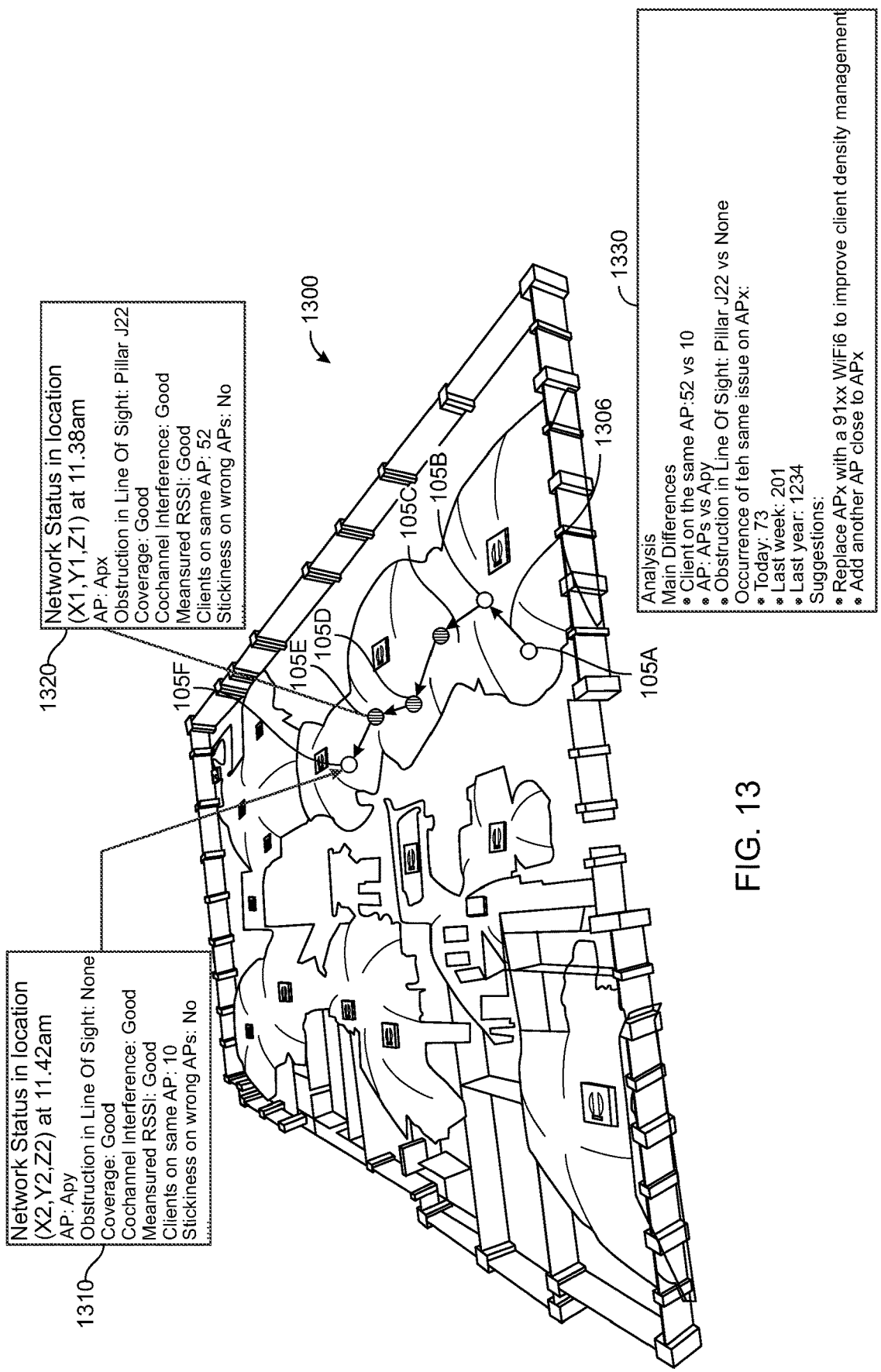
FIG. 13 illustrates an example 3-D visualization of a wireless signal propagation including a client path according to some aspects of the disclosed technology.

In some examples, the visualization of the RF propagation pattern includes a path representing a motion of one or more client devices. Referring to FIG. 13, an example 3-D visualization 1300 of a RF propagation pattern including a client path 1306 is illustrated in FIG. 13. In some instances, a client's motion or path 1306 can be tracked in the visualization of the RF propagation pattern 1300. The client path 1306 can be formed by connecting dots (i.e., client devices) 105A-105F representing the location of the client device at different times. In some examples, the visualization including the client path is based on the telemetry data including location data of the client device stored with timestamp at different times.

In some examples, a color, shape, or pattern of the dots (i.e., client devices) 105 can indicate a network status/performance or quality of service (QoS) of the cell zone where the client device is located. For example, in the 3-D visualization 1300 in FIG. 13, client devices 105A, 105B, and 105F are marked as blank dots while client devices 105C, 105D, and 105D that are having an issue are marked with a pattern to note the difference in the network performance or quality of service.

In some instances, the 3-D visualization 1300 can provide status report 1310 or 1320 of the location of the selected client device 105F or 105E, respectively. The status reports 1310 and 1320 provide detailed status information of the particular client device and the network where the particular client device is connected. The detailed status information can include exact coordinates of the location of the selected client device, timestamp, an AP that the client device is connected to, any obstruction in line of sight (e.g., a pillar), coverage status, co-channel interference, measured RSSI, a number of other client devices connected to the same AP, stickiness of the roaming client on wrong APs, etc.

Furthermore, based on the network status/performance or the QoS, further analysis (e.g., cause of any issue) and suggestions to resolve any issue in the network can be provided in the visualization. As shown in FIG. 13, the 3-D visualization 1300 of the RF propagation pattern includes analysis and suggestion box 1330 providing detailed analysis of the network performance and suggestions to resolve any issue in the network. For example, the analysis and suggestion box 1330 can include main differences in client on the same AP, type of AP the client devices are connected to, obstruction in line of sight. The analysis and suggestion box 1330 can further include occurrence of the same issue on the AP and suggestions (e.g., replacing the AP with another AP with Wi-Fi 6 to improve client density management or adding another AP).

In some examples, clicking on the dots (i.e., client devices) in the visualization can display the network status or performance (e.g., configuration, RRM data, key assurance data, coverage, AP power, stickiness of clients to other APs) for the selected client device.

In some instances, the 3-D visualization 1300 can identify client devices connected to each of the APs and mark client devices (i.e., dots) in different colors, shapes, or patterns based on RSSI values (e.g., high, medium, or low). For example, a client device with high RSSI value can be represented in green, a client device with medium RSSI value in yellow, and a client device with low RSSI value in red.

FIGS. 14A-14F illustrates example 3-D visualizations 1400A-1400F of a Wi-Fi signal propagation including interference on a backhaul over time. The efficacy of mesh networks depends on how the backhaul is operating. For example, interferences on the backhaul can significantly impact the traffic flow and reduce bandwidth. As such, the visualization illustrating the interferences on the backhaul can help in designing and deployment of the Wi-Fi network. The 3-D visualizations 1400A-1400F representing the interference on the backhaul over time can also be provided as an animation where 3-D visualizations can be played continuously in sequential order over time.

Figure 14A:
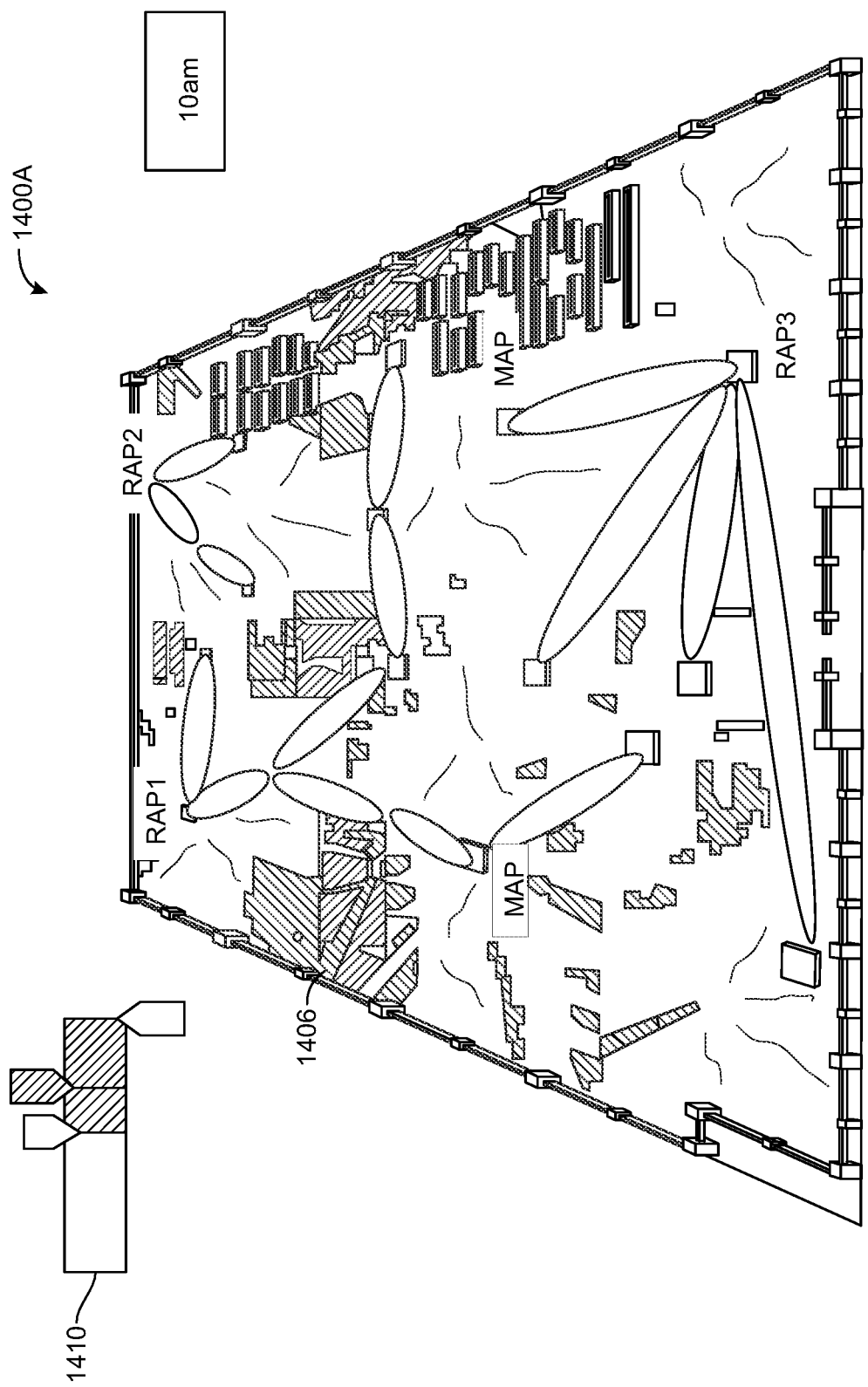
FIGS. 14A-14F illustrates example 3-D visualizations of a wireless signal propagation including interference on a backhaul over time according to some aspects of the disclosed technology.
Figure 14B:
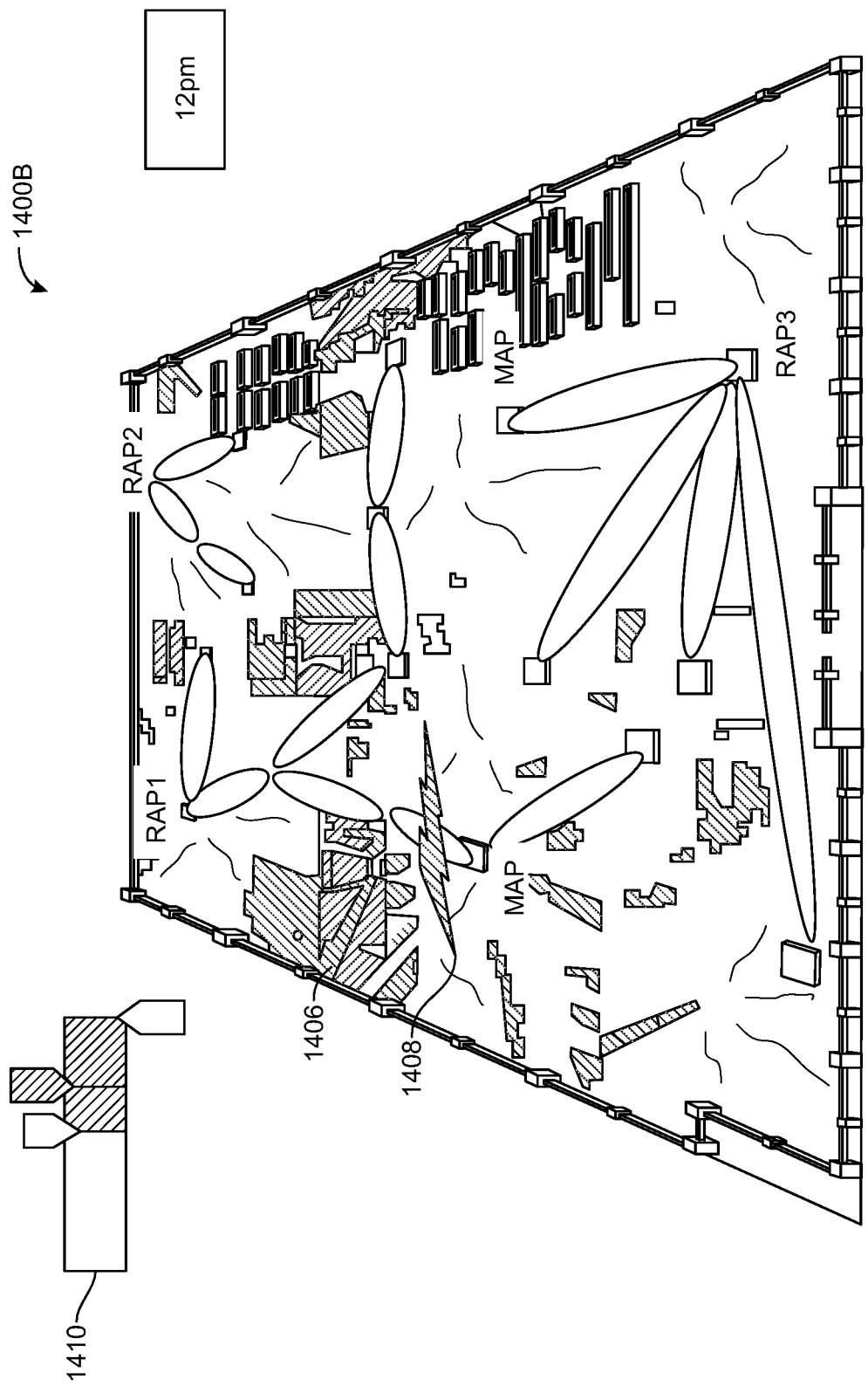
Figure 14C:
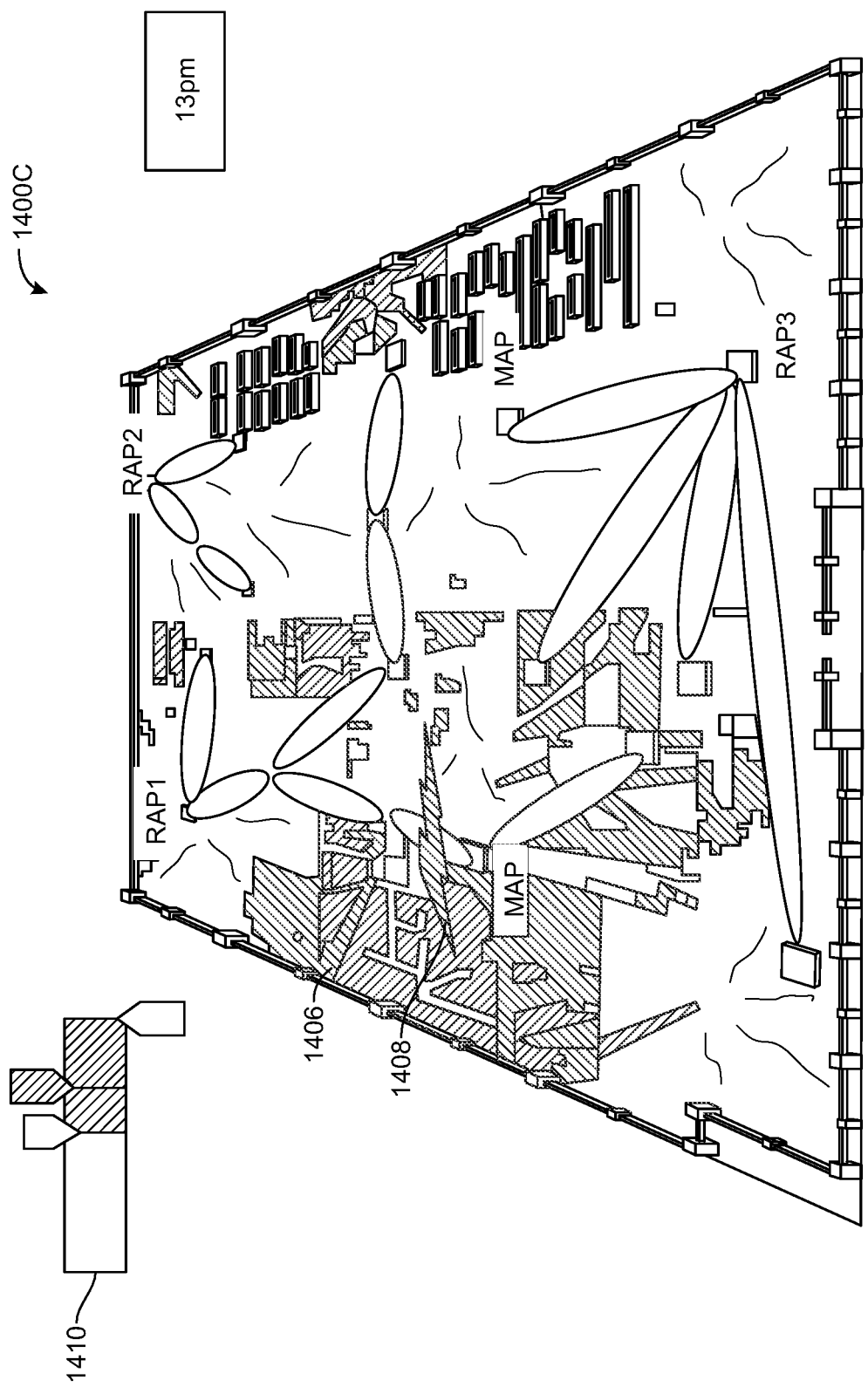
Figure 14D:
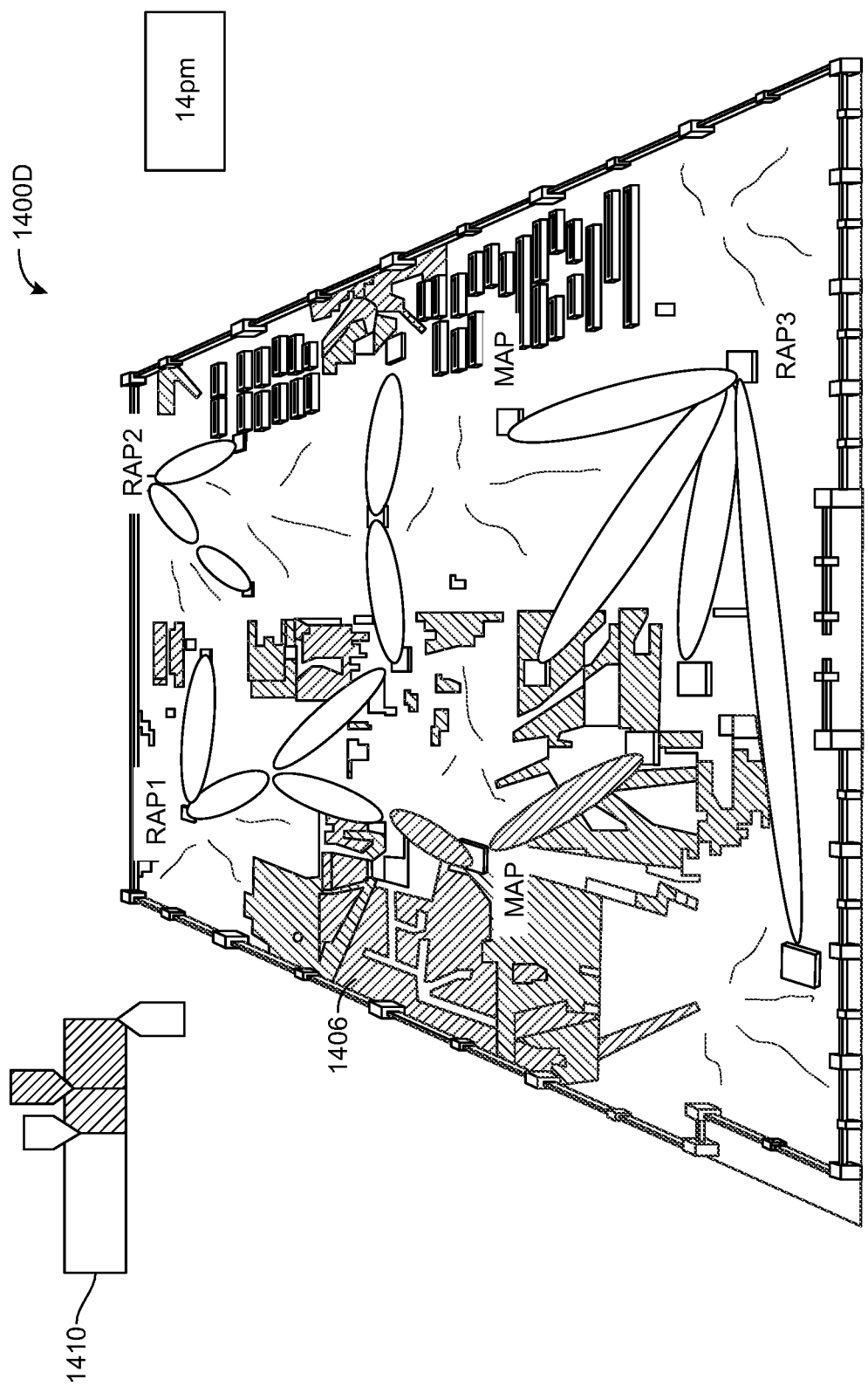
Figure 14E:
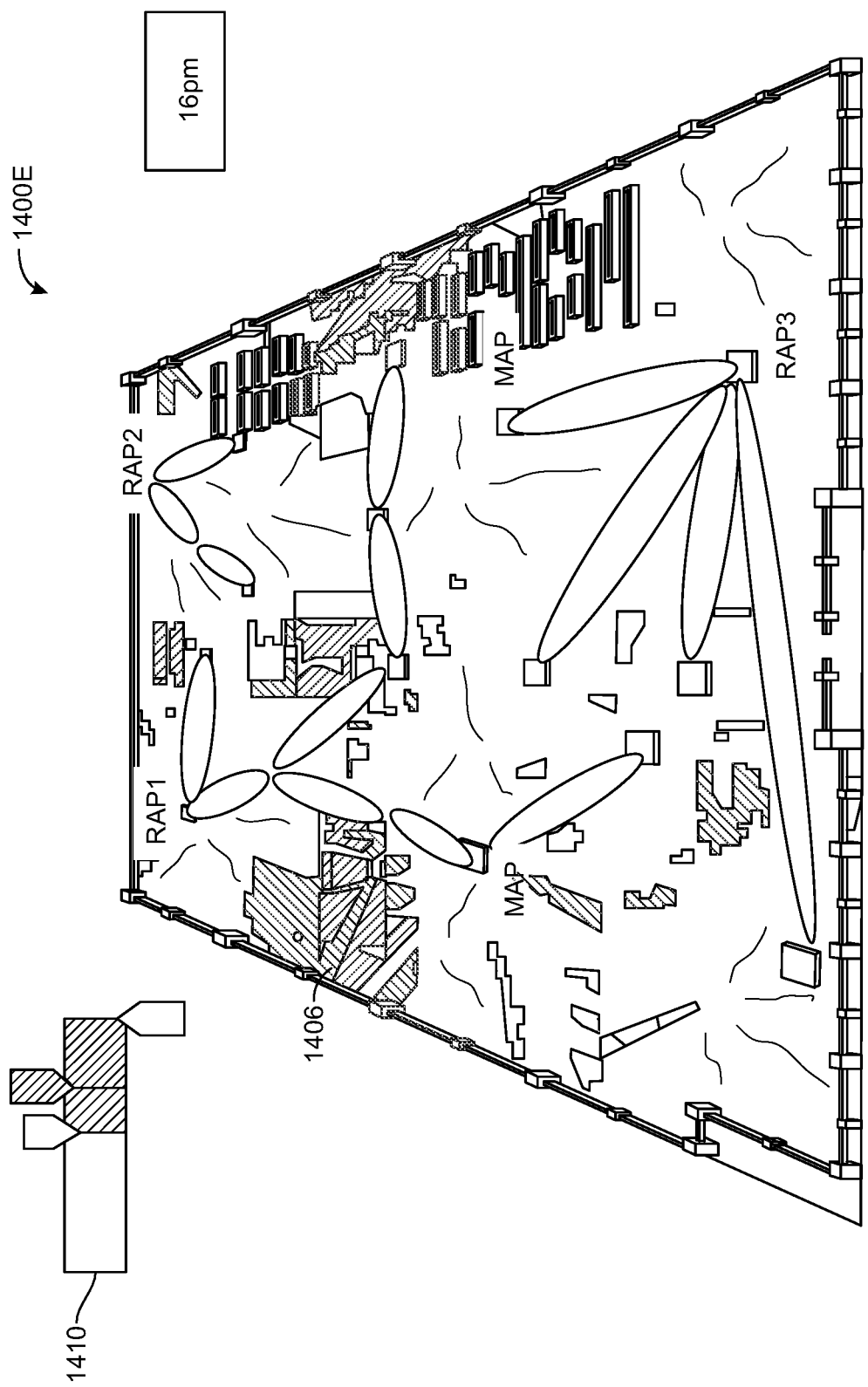
Figure 14F:
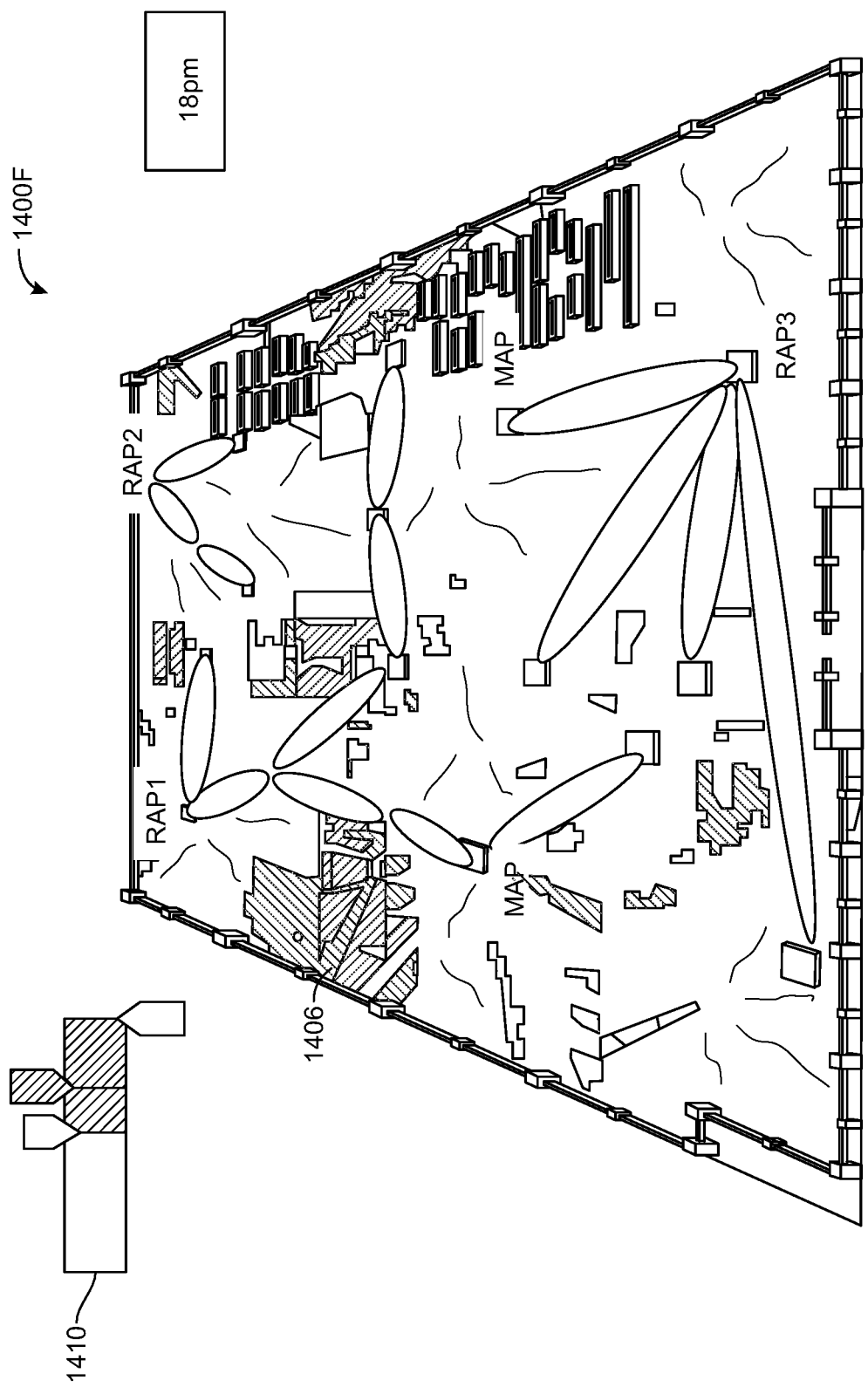

According to some examples, the telemetry data includes interference on a backhaul. In some instances, the interference on the backhaul is associated with attenuation of the RF propagation pattern within the 3-D space. Also, the presenting the visualization of the RF propagation pattern includes displaying the interference on the backhaul 1408 in the visualization of the RF propagation pattern 1400B and 1400C as illustrated in FIGS. 14B and 14C.

Upon monitoring and detecting the interferences on backhaul 1408, one or more suggestions can be provided to resolve the issue, for example, changing the channel, recommending a user to adopt a different type of mesh topology (e.g., daisy chain), or recommending a user to use a different serial backhaul.

In some examples, the 3-D visualization 1400A-1400F includes a user interface 1410 that is effective to adjust the signal strength thresholds. For example, an area 1406 whose signal strength is lower than a threshold (as indicated in the user interface 1410) can be visually identified in a different color or pattern.

In some examples, the visualization is an animation of a change in the RF propagation pattern for the at least one Wi-Fi AP in the Wi-Fi network. For example, various 3-D visualizations of the RF propagation pattern 1200A-1200D illustrated in FIGS. 12A-12D or 1400A-1400F illustrated in FIGS. 14A-14F can be displayed continuously and sequentially as an animation to show the progress or evolution of the network performance in time.

According to some examples, the animation of the change in the Wi-Fi coverage in method 700 or the animation of the change in the RF propagation pattern includes an amination of quality of service (QoS) coverage. Details of the animation of the QoS coverage are described in connection with FIGS. 15A and 15B, which illustrate example 3-D visualizations 1500A and 1500B including analysis and troubleshooting of the network.

In some examples of the presenting the animation of the QoS coverage, method 700 or method 800 comprises determining at least one first service area for the at least one Wi-Fi AP based on a predicted coverage of the at least one Wi-Fi AP at a first time. For example, the visualization service 108 illustrated in FIG. 1 may determine at least one first service area for the at least one Wi-Fi AP based on a predicted coverage of the at least one Wi-Fi AP at a first time.

Further, method 700 or method 800 comprises determining at least one second service area for the at least one Wi-Fi AP based on a predicted coverage of the at least one Wi-Fi AP at a second time. For example, the visualization service 108 illustrated in FIG. 1 may determine at least one second service area for the at least one Wi-Fi AP based on a predicted coverage of the at least one Wi-Fi AP at a second time.

Further, method 700 or method 800 comprises presenting the animation of the QoS coverage by sequentially displaying the at least one first service area at the first time and the at least one second service area at the second time. In some instances, the predicted coverage can be determined based on one or more parameters associated with a QoS. For example, the visualization service 108 illustrated in FIG. 1 may present the animation of the QoS coverage by sequentially display the at least one first service area at the first time and the at least one second service area at the second time.

In some examples, the one or more parameters associated with the QoS includes SNR measurement, latency measurement, transmission power, and a number of client devices connected to the at least one Wi-Fi AP (e.g., client density). For example, in FIGS. 15A and 15B, small dots represent client devices 105 in the cell zone for each AP 102. In some instances, the QoS coverage can be graphically represented in different colors, shapes, patterns, or any other applicable markers based on the client density. For example, a service area with high client density can be displayed in red and a service area with low client density can be displayed in green.

Further, method 700 or method 800 comprises detecting a poor QoS area by comparing the one or more parameters associated with the QoS with a threshold. For example, the visualization service 108 illustrated in FIG. 1 may detect a poor QoS area by comparing the one or more parameters associated with the QoS with a threshold.

Figure 15A:
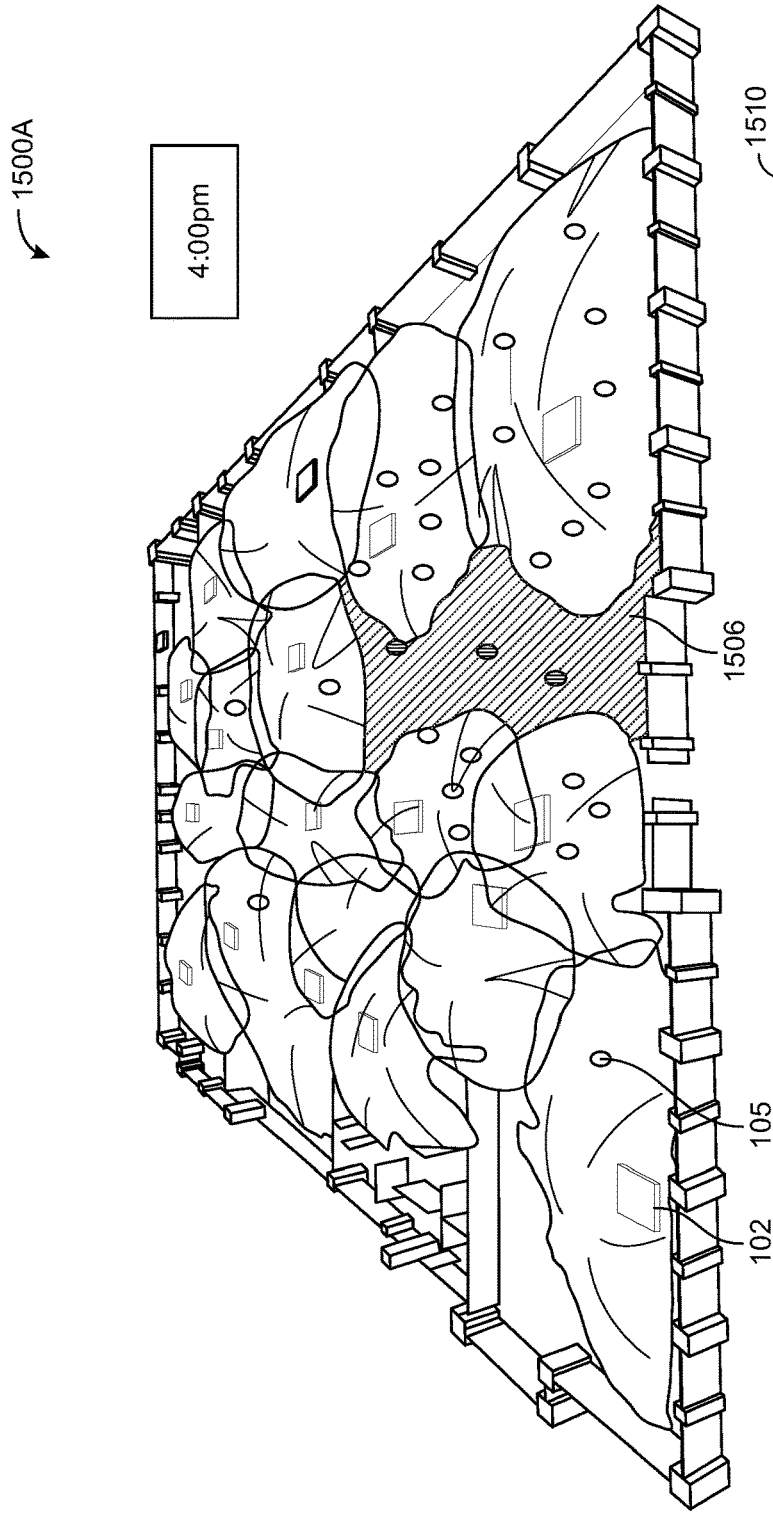
FIGS. 15A and 15B illustrate example 3-D visualizations of a wireless signal propagation including analysis and troubleshooting of the network according to some aspects of the disclosed technology.

Further, method 700 or method 800 comprises visually identifying the poor QoS area in the animation of the QoS coverage. For example, the visualization service 108 illustrated in FIG. 1 may visually identify the poor QoS area in the animation of the QoS coverage. Referring to FIG. 15A, the poor QoS area 1506 can be identified in a different color, shape, or a bubble in the 3-D visualization 1500A.

Figure 15B:
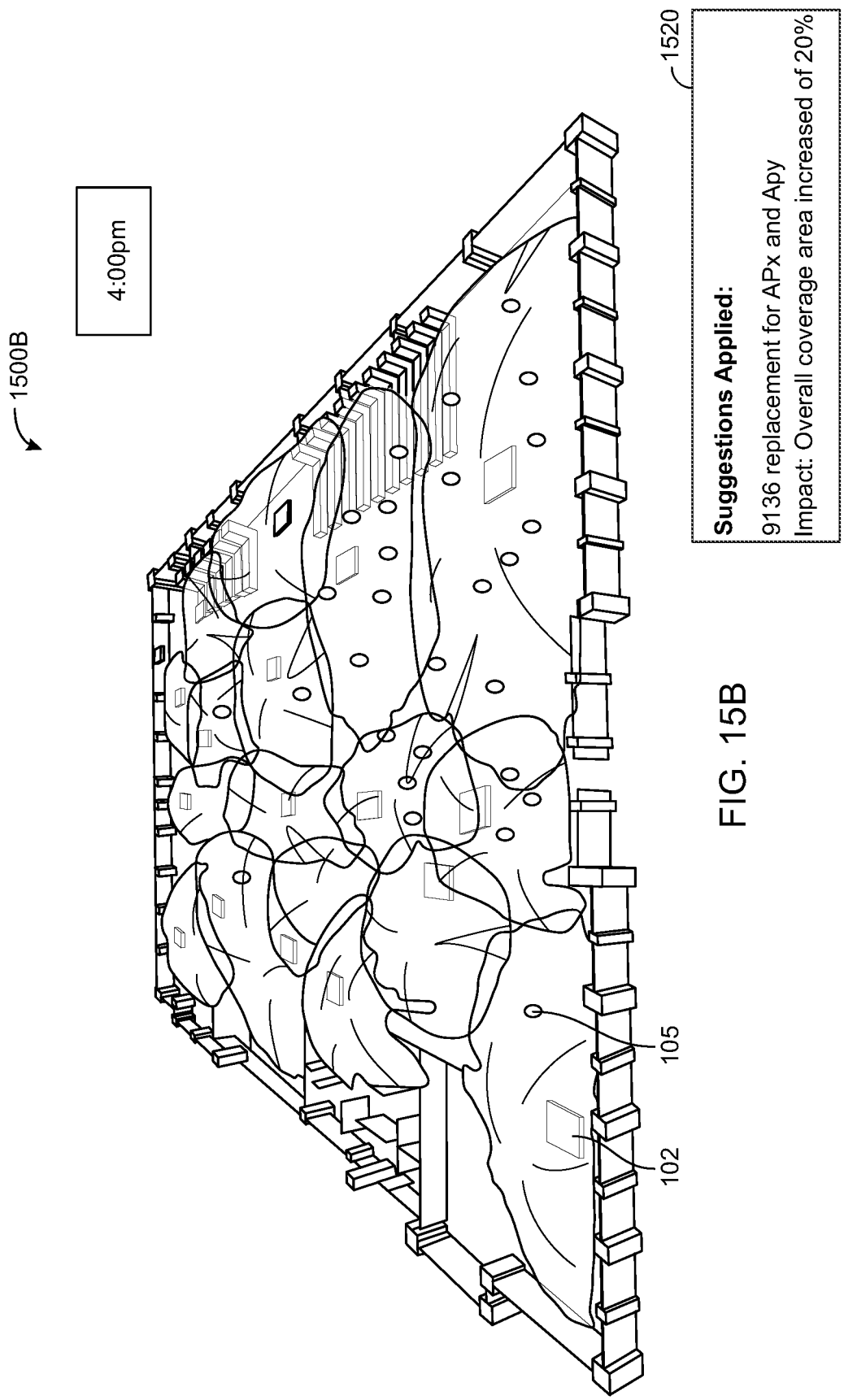

Further, method 700 or method 800 comprises providing one or more suggestions to improve the one or more parameters associated with the QoS for the poor QoS area in the animation of the QoS coverage. For example, the troubleshooting service 116 or the optimization service 118 illustrated in FIG. 1 may provide one or more suggestions to improve the one or more parameters associated with the QoS for the poor QoS area in the animation of the QoS coverage. Referring to FIGS. 15A and 15B, the 3-D visualization 1500A includes analysis 1510 of the network performance and suggestions 1520 to resolve any issue in the network. For example, the analysis provided in the 3-D visualization 1500A includes identifying a cause of the poor network performance (e.g., client density). Also, the suggestions to resolve the issue include the replacement of an AP or the placement of a new AP in a certain location as shown in FIG. 15B.

Further, method 700 or method 800 comprises providing one or more simulated visualizations of an improved Wi-Fi coverage based on the one or more suggestions. For example, the simulation service 120 illustrated in FIG. 1 may provide one or more simulated visualizations of an improved Wi-Fi coverage based on the one or more suggestions.

According to some examples, a 3-D visualization in accordance with the present disclose is based on a combination of telemetry data and theoretical predictive models, rather than gathering, analyzing, and visualizing the RF telemetry data solely. In some instances, theoretically predicted RF patterns are represented in a 3-D visualization based on various path loss models. For example, the 3-D visualization can be produced by utilizing ray-tracing based on the environment geometry. Also, telemetry data can be overlaid on top of the predicted data so that areas of discrepancy between predicted and measures values can be represented in the 3-D visualization.

According to some examples, telemetry data can be used in refining and correcting theoretically predicted values of the RF KPIs to enhance the confidence of the predicted values. Such cumulative result (e.g., theoretically predicted values corrected/refined with the telemetry data) can be displayed in a 3-D visualization as a single coherent surface/point cloud.

According to some examples, the telemetry data includes information associated with capacity in the network. For the dynamically changing network, an accurate capacity prediction based on the telemetry data can help better understand how the network is performing with insights into coverage, latency, and capacity. According to some examples, 3-D capacity modeling based on telemetry data can be provided with the 3-D visualization system (e.g., the 3-D signal propagation visualization system 100 illustrated in FIG. 1) as follows.

In some examples, method 700 or method 800 can further comprise calculating the RF propagation pattern for the at least one Wi-Fi AP based on a RF propagation model for the at least one Wi-Fi AP, wherein the RF propagation model is dependent on multiple-input and multiple-output (MIMO) capacity equations that include channel attribute variables.

Further, method 700 or method 800 comprises querying one or more second Wi-Fi APs or sensors located at a second location of the building plan to determine telemetry data for the channel attribute variables for the at least one Wi-Fi AP; and Further, method 700 or method 800 comprises inputting values derived from the telemetry data for the channel attribute variables into the RF propagation model to update the RF propagation model based on historical telemetry data.

In some examples, the telemetry data for the channel attribute variables for the at least one Wi-Fi AP includes estimates or averages for the channel attribute variables based on the historical telemetry data observed by a Wi-Fi system controller.

In some instances, the channel attribute variables include channel load statistics (e.g., Wi-Fi or non-Wi-Fi interference %), capacity information, or estimates of spectral, spatial, and temporal distribution of client devices consuming capacity.

Figure 16A:
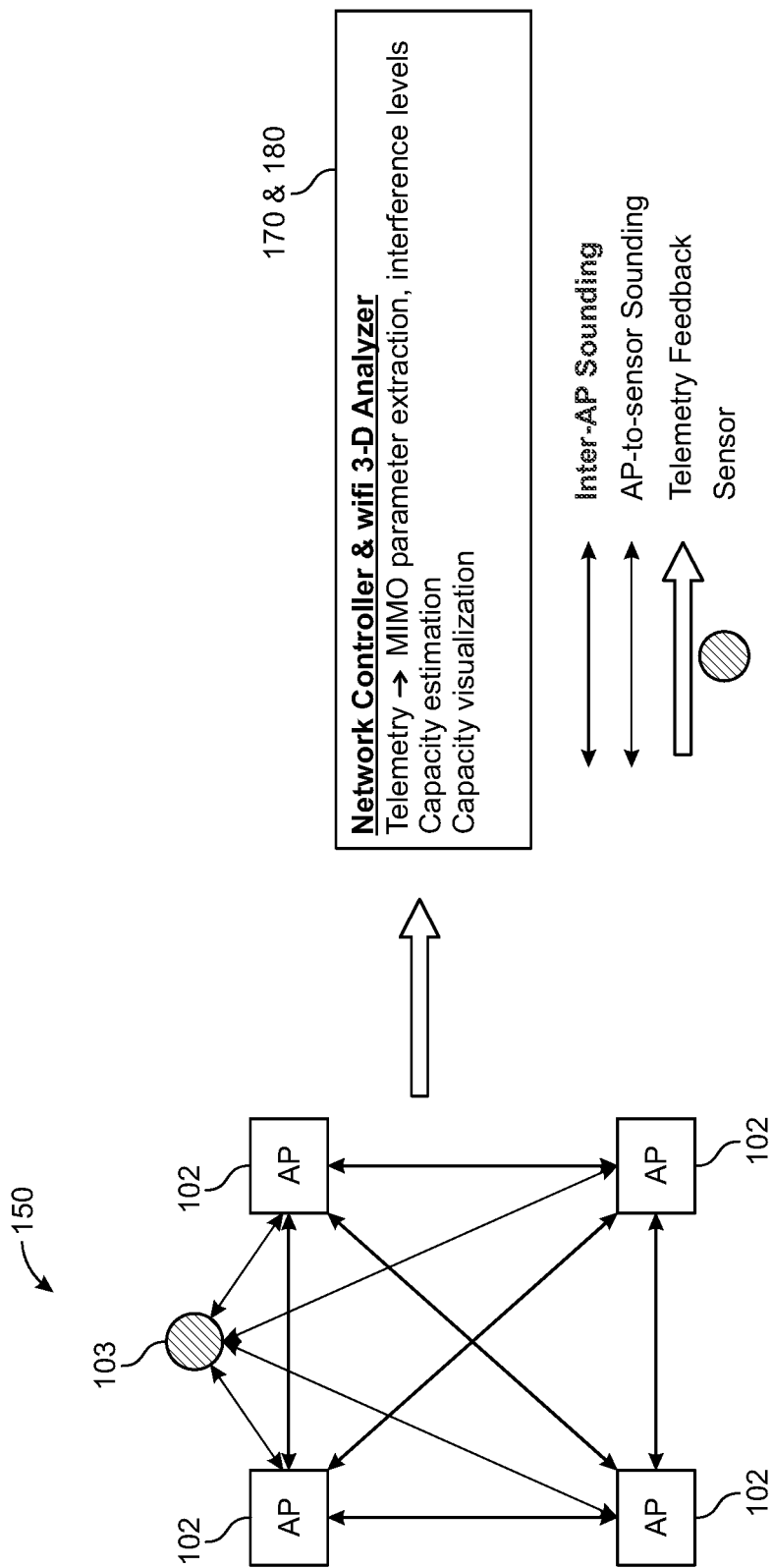
FIGS. 16A and 16B illustrate an example 3-D visualization system where 3-D capacity modeling is employed according to some aspects of the disclosed technology.

FIG. 16A illustrates the 3-D signal propagation visualization system 100 where 3-D capacity modeling is employed. In some examples, the wireless network 150 can transmit telemetry feedback (for example, telemetry data 156 illustrated in FIG. 2) to the network controller 170. For example, each AP 102 and sensor 103, by engaging in inter-AP sounding or AP-to-sensor sounding, can provide and transmit sounding information as telemetry data to the network controller 170. The sounding information can include AP channel load statistics, singular value estimates, or summaries on how the estimates vary spatially, temporally, and spectrally. The network controller 170 and the Wi-Fi 3-D analyzer 180 can, based on the received sounding telemetry data, extract MIMO parameters used in the MIMO capacity equations. In some instances, the visualization service 108 illustrated in FIG. 1 can provide a 3-D visualization including the capacity information.

Figure 16B:
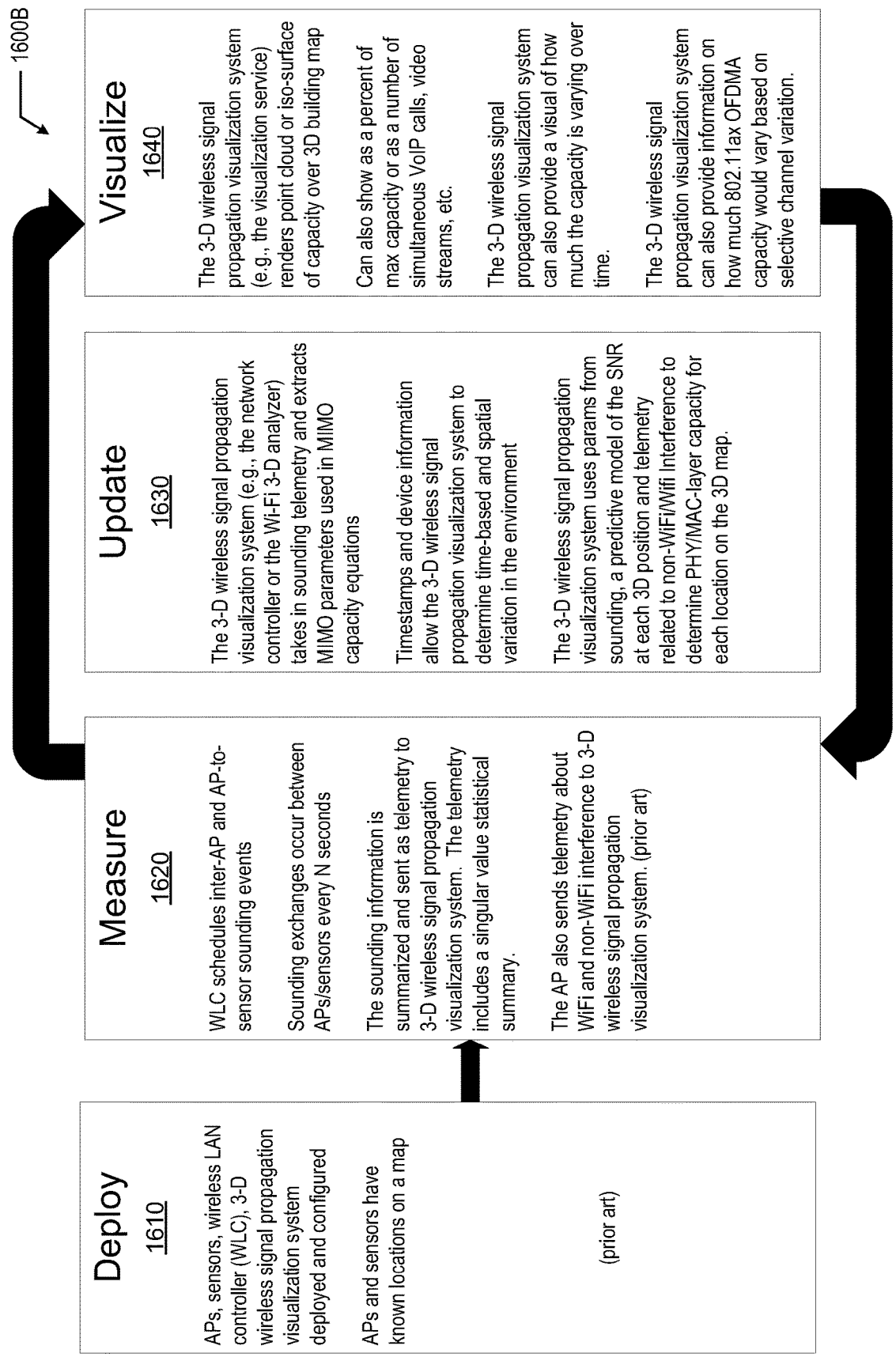

FIG. 16B illustrates an example workflow 1600B of 3-D capacity modeling in the 3-D signal propagation visualization system. The workflow 1600B comprises various stages of deployment 1610, measurement 1620, update 1630, and visualization 1640. Details of the above-described process of employing 3-D capacity modeling in the 3-D signal propagation visualization system is illustrated in FIG. 16B.

Although the example methods 700 and 800 depict a particular sequence of operations, the sequence may be altered interchangeably between method 700 and method 800 without departing from the scope of the present disclosure.

Figure 17:
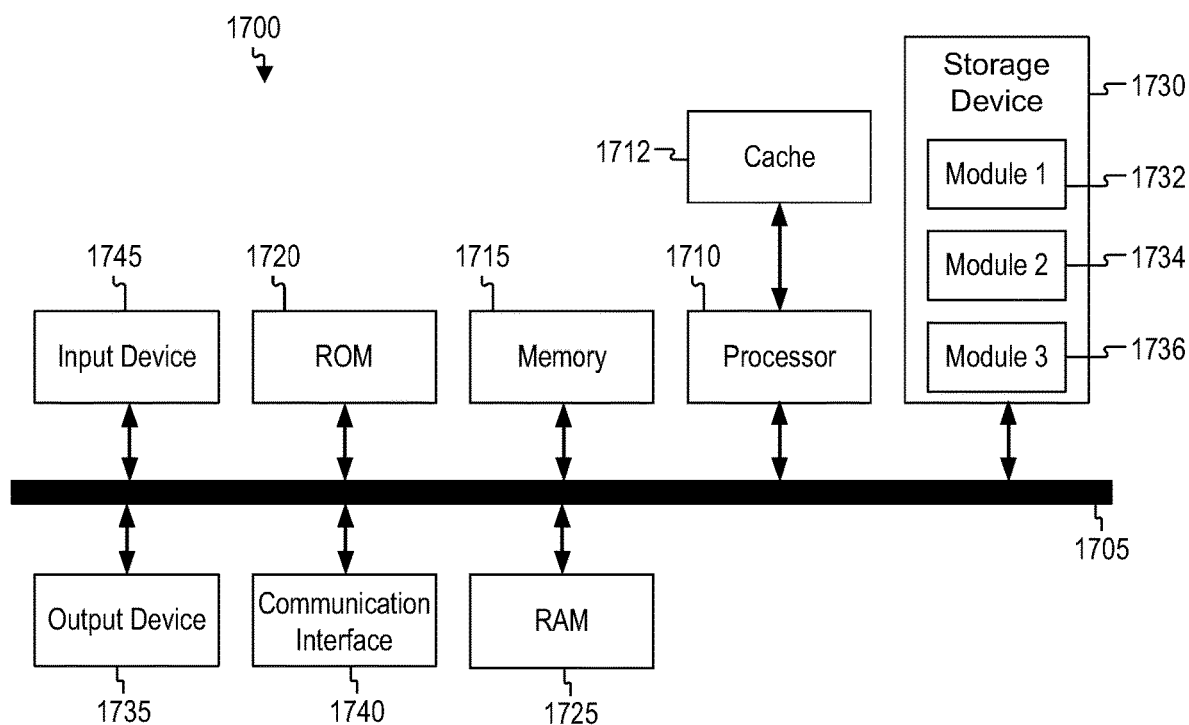
FIG. 17 shows an example of computing system 1400, which can be for example any computing device that can implement components of the system illustrated in FIG. 1.

FIG. 17 shows an example of computing system 1700, which can be for example any computing device making up 3-D signal propagation visualization system 100, or any component thereof in which the components of the system are in communication with each other using connection 1705. Connection 1705 can be a physical connection via a bus, or a direct connection into processor 1710, such as in a chipset architecture. Connection 1705 can also be a virtual connection, networked connection, or logical connection.

In some embodiments computing system 1700 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 1700 includes at least one processing unit (CPU or processor) 1710 and connection 1705 that couples various system components including system memory 1715, such as read only memory (ROM) 1720 and random access memory (RAM) 1725 to processor 1710. Computing system 1700 can include a cache of high-speed memory 1712 connected directly with, in close proximity to, or integrated as part of processor 1710.

Processor 1710 can include any general purpose processor and a hardware service or software service, such as services 1732, 1734, and 1736 stored in storage device 1730, configured to control processor 1710 as well as a special-purpose processor where software instructions are incorporated into the actual processor design. Processor 1710 may essentially be a completely self-contained computing system, containing multiple cores or processors, a bus, memory controller, cache, etc. A multi-core processor may be symmetric or asymmetric.

To enable user interaction, computing system 1700 includes an input device 1745, which can represent any number of input mechanisms, such as a microphone for speech, a touch-sensitive screen for gesture or graphical input, keyboard, mouse, motion input, speech, etc. Computing system 1700 can also include output device 1735, which can be one or more of a number of output mechanisms known to those of skill in the art. In some instances, multimodal systems can enable a user to provide multiple types of input/output to communicate with computing system 1700. Computing system 1700 can include communications interface 1740, which can generally govern and manage the user input and system output. There is no restriction on operating on any particular hardware arrangement and therefore the basic features here may easily be substituted for improved hardware or firmware arrangements as they are developed.

Storage device 1730 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 1730 can include software services, servers, services, etc., that when the code that defines such software is executed by the processor 1710, it causes the system to perform a function. In some embodiments, a hardware service that performs a particular function can include the software component stored in a computer-readable medium in connection with the necessary hardware components, such as processor 1710, connection 1705, output device 1735, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Illustrative examples of the disclosure include:

Aspect 1: A method comprising: receiving telemetry data for at least one Wi-Fi access point located at a location of a building plan in a Wi-Fi visualization system; determining a change in a Wi-Fi coverage for the at least one Wi-Fi access point based on the telemetry data; and presenting a visualization illustrating the change in the Wi-Fi coverage for the at least one Wi-Fi access point.

Aspect 2: The method of Aspect 1, wherein the telemetry data is received in real-time, and the presenting the visualization includes: presenting the change in the Wi-Fi coverage for the at least one Wi-Fi access point, and persisting the presented change in the visualization according to a decay factor, wherein the decay factor expires when another change in the Wi-Fi coverage occurs.

Aspect 3: The method of any of Aspects 1 to 2, wherein the telemetry data is received from at least one of one or more sensors, at least one second Wi-Fi access point, or a client device located at a second location of the building plan.

Aspect 4: The method of any of Aspects 1 to 3, wherein the telemetry data includes a dynamic channel assignment, dynamic frequency selection (DFS), channel loads, co-channel interference, signal-to-noise ratio (SNR), or transmission power level adjustment.

Aspect 5: The method of any of Aspects 1 to 4, wherein the presenting the visualization illustrating the change in the Wi-Fi coverage for the at least one Wi-Fi access point comprises: visually identifying the at least one Wi-Fi access point that is an origin for the change in the Wi-Fi coverage with a first identification; and visually identifying a second Wi-Fi access point with a second identification, wherein a change in a Wi-Fi coverage for the second Wi-Fi access point is a result of the change in the Wi-Fi coverage for the at least one Wi-Fi access point that is the origin for the change in the Wi-Fi coverage.

Aspect 6: The method of any of Aspects 1 to 5, wherein the telemetry data includes the SNR, the method further comprising: determining that the SNR is greater than a threshold; and visually identifying an area of the building plan where the SNR is greater than the threshold.

Aspect 7: The method of any of Aspects 1 to 6, further comprising: storing the telemetry data with a timestamp; wherein the presenting the visualization includes: presenting an animation of the change in the Wi-Fi coverage for the at least one Wi-Fi access point based on the stored telemetry data.

Aspect 8: The method of any of Aspects 1 to 7, further comprising: presenting the animation with a time slider to facilitate manipulation of a time axis associated with the timestamp for the telemetry data to visualize the change in the Wi-Fi coverage for the at least one Wi-Fi access point at times corresponding to the timestamp.

Aspect 9: The method of any of Aspects 1 to 8, wherein the animation of the change in the Wi-Fi coverage includes an animation of a quality of service (QoS) coverage, the method comprising: determining at least one first service area for the at least one Wi-Fi access point based on a predicted coverage of the at least one Wi-Fi access point at a first time; determining at least one second service area for the at least one Wi-Fi access point based on a predicted coverage of the at least one Wi-Fi access point at a second time; and presenting the animation of the QoS coverage by sequentially displaying the at least one first service area at the first time and the at least one second service area at the second time, wherein the predicted coverage is based on one or more parameters associated with a QoS.

Aspect 10: The method of any of Aspects 1 to 9, wherein the one or more parameters associated with the QoS include at least one of SNR measurements, latency measurements, transmission power, and a number of client devices connected to the at least one Wi-Fi access point.

Aspect 11: The method of any of Aspects 1 to 10, further comprising: detecting a poor QoS area by comparing the one or more parameters associated with the QoS with a threshold; and visually identifying the poor QoS area in the animation of the QoS coverage.

Aspect 12: The method of any of Aspects 1 to 11, further comprising: providing one or more suggestions to improve the one or more parameters associated with the QoS for the poor QoS area in the animation of the QoS coverage.

Aspect 13: The method of any of Aspects 1 to 12, further comprising: providing one or more simulated visualizations of an improved Wi-Fi coverage based on the one or more suggestions.

Aspect 14: The method of any of Aspects 1 to 13, wherein the visualization is a 5 GHz DFS channel allocation animation, wherein the change in the Wi-Fi coverage for the at least one Wi-Fi access point at times corresponding to the timestamp is a change in use of a DFS channel; the method further comprising identifying a time in which a periodic change in use of the DFS channel occurs.

Aspect 15: The method of any of Aspects 1 to 14, wherein the presenting the visualization illustrating the change in the Wi-Fi coverage for the Wi-Fi at least one access point includes presenting a radio frequency (RF) propagation pattern in 3-D for the at least one Wi-Fi access point.

Aspect 16: The method of any of Aspects 1 to 15, wherein the presenting the RF propagation pattern in 3-D for the at least one Wi-Fi access point comprises: calculating the RF propagation pattern for the at least one Wi-Fi access point based on a RF propagation model for the at least one Wi-Fi access point, the calculating including: projecting a plurality of ray-paths in a plurality of directions in 3-D space, wherein the ray-paths originate from the at least one Wi-Fi access point and emanate in a variety of X, Y, and Z planes; determining whether the ray-paths interface with one or more objects defined in the building plan; for each ray-path of the ray-paths that interface with the one or more objects defined in the building plan, segmenting the respective ray-path into contiguous segments of substantially uniform mediums; and determining a RF signal strength at points along the contiguous segments of the ray-paths, wherein the RF signal strength degrades along the contiguous segments of the ray-paths as defined by the RF propagation model as a function of distance through the contiguous segments and characteristics of the RF propagation pattern through the substantially uniform mediums through which the segment traverses; and overlaying the RF propagation pattern for the at least one Wi-Fi access point over a visualization of the building plan.

Aspect 17: The method of any of Aspects 1 to 16, wherein the presenting the RF propagation pattern in 3-D for the Wi-Fi access point comprises: calculating the RF propagation pattern for the at least one Wi-Fi access point based on a RF propagation model for the at least one Wi-Fi access point, wherein the RF propagation model is dependent on multiple-input and multiple-output (MIMO) capacity equations that include channel attribute variables; querying one or more second Wi-Fi access points or sensors located at a second location of the building plan to determine telemetry data for the channel attribute variables for the at least one Wi-Fi access point; and inputting values derived from the telemetry data for the channel attribute variables into the RF propagation model to update the RF propagation model based on historical telemetry data.

Aspect 18: The method of any of Aspects 1 to 17, wherein the telemetry data for the channel attribute variables for the at least one Wi-Fi access point includes estimates or averages for the channel attribute variables based on the historical telemetry data observed by a Wi-Fi system controller.

Aspect 19: The method of any of Aspects 1 to 18, wherein the channel attribute variables include at least one of channel load statistics, capacity information, or estimates of spectral, spatial, and temporal distribution of client devices consuming capacity.

Aspect 20: A system for visualizing a Wi-Fi access point radio frequency propagation pattern based on telemetry data, comprising: a storage configured to store instructions; a processor configured to execute the instructions and cause the processor to: receive telemetry data for at least one Wi-Fi access point located at a location of a building plan in a Wi-Fi visualization system, determine a change in a Wi-Fi coverage for the at least one Wi-Fi access point based on the telemetry data, and present a visualization illustrating the change in the Wi-Fi coverage for the at least one Wi-Fi access point.

Aspect 21: The system of Aspect 20, wherein the processor is configured to execute the instructions and cause the processor to: present the change in the Wi-Fi coverage for the at least one Wi-Fi access point; and persist the presented change in the visualization according to a decay factor, wherein the decay factor expires when another change in the Wi-Fi coverage occurs.

Aspect 22: The system of any of Aspects 20 to 21, wherein the telemetry data is received from at least one of one or more sensors, at least one second Wi-Fi access point, or a client device located at a second location of the building plan.

Aspect 23: The system of any of Aspects 20 to 22, wherein the telemetry data includes a dynamic channel assignment, dynamic frequency selection (DFS), channel loads, co-channel interference, signal-to-noise ratio (SNR), or transmission power level adjustment.

Aspect 24: The system of any of Aspects 20 to 23, wherein the processor is configured to execute the instructions and cause the processor to: visually identify the at least one Wi-Fi access point that is an origin for the change in the Wi-Fi coverage with a first identification; and visually identify a second Wi-Fi access point with a second identification, wherein a change in a Wi-Fi coverage for the second Wi-Fi access point is a result of the change in the Wi-Fi coverage for the at least one Wi-Fi access point that is the origin for the change in the Wi-Fi coverage.

Aspect 25: The system of any of Aspects 20 to 24, wherein the processor is configured to execute the instructions and cause the processor to: determine that the SNR is greater than a threshold; and identifying an area of the building plan where the SNR is greater than the threshold.

Aspect 26: The system of any of Aspects 20 to 25, wherein the processor is configured to execute the instructions and cause the processor to: store the telemetry data with a timestamp; and the presenting the visualization includes: presenting an animation of the change in the Wi-Fi coverage for the at least one Wi-Fi access point based on the stored telemetry data.

Aspect 27: The system of any of Aspects 20 to 26, wherein the processor is configured to execute the instructions and cause the processor to: present the animation with a time slider to facilitate manipulation of a time axis associated with the timestamp for the telemetry data to visualize the change in the Wi-Fi coverage for the at least one Wi-Fi access point at times corresponding to the timestamp.

Aspect 28: The system of any of Aspects 20 to 27, wherein the processor is configured to execute the instructions and cause the processor to: determine at least one first service area for the at least one Wi-Fi access point based on a predicted coverage of the at least one Wi-Fi access point at a first time; determine at least one second service area for the at least one Wi-Fi access point based on a predicted coverage of the at least one Wi-Fi access point at a second time; and present the animation of the QoS coverage by sequentially display the at least one first service area at the first time and the at least one second service area at the second time, wherein the predicted coverage is based on one or more parameters associated with a QoS.

Aspect 29: The system of any of Aspects 20 to 28, wherein the one or more parameters associated with the QoS includes at least one of SNR measurements, latency measurements, transmission power, and a number of client devices connected to the at least one Wi-Fi access point.

Aspect 30: The system of any of Aspects 20 to 29, wherein the processor is configured to execute the instructions and cause the processor to: detect a poor QoS area by compare the one or more parameters associated with the QoS with a threshold; and visually identify the poor QoS area in the animation of the QoS coverage.

Aspect 31: The system of any of Aspects 20 to 30, wherein the processor is configured to execute the instructions and cause the processor to: provide one or more suggestions to improve the one or more parameters associated with the QoS for the poor QoS area in the animation of the QoS coverage.

Aspect 32: The system of any of Aspects 20 to 31, wherein the processor is configured to execute the instructions and cause the processor to: provide one or more simulated visualizations of an improved Wi-Fi coverage based on the one or more suggestions.

Aspect 33: The system of any of Aspects 20 to 32, wherein the processor is configured to execute the instructions and cause the processor to: identify a time in which a periodic change in use of the DFS channel occurs, wherein the visualization is a 5 GHz DFS channel allocation animation and the change in the Wi-Fi coverage for the at least one Wi-Fi access point at times corresponding to the timestamp is a change in use of a DFS channel.

Aspect 34: The system of any of Aspects 20 to 33, wherein the presenting the visualization illustrating the change in the Wi-Fi coverage for the Wi-Fi at least one access point includes presenting a radio frequency (RF) propagation pattern in 3-D for the at least one Wi-Fi access point.

Aspect 35: The system of any of Aspects 20 to 34, wherein the processor is configured to execute the instructions and cause the processor to: calculate the RF propagation pattern for the at least one Wi-Fi access point based on a RF propagation model for the at least one Wi-Fi access point, the calculating include; project a plurality of ray-paths in a plurality of directions in 3-D space, wherein the ray-paths originate from the at least one Wi-Fi access point and emanate in a variety of X, Y, and Z planes; determine whether the ray-paths interface with one or more objects defined in the building plan; for each ray-path of the ray-paths that interface with the one or more objects defined in the building plan, segmenting the respective ray-path into contiguous segments of substantially uniform mediums; determine a RF signal strength at points along the contiguous segments of the ray-paths, wherein the RF signal strength degrades along the contiguous segments of the ray-paths as defined by the RF propagation model as a function of distance through the contiguous segments and characteristics of the RF propagation pattern through the substantially uniform mediums through which the segment traverses; and overlay the RF propagation pattern for the at least one Wi-Fi access point over a visualization of the building plan.

Aspect 36: The system of any of Aspects 20 to 35, wherein the processor is configured to execute the instructions and cause the processor to: calculate the RF propagation pattern for the at least one Wi-Fi access point based on a RF propagation model for the at least one Wi-Fi access point, wherein the RF propagation model is dependent on multiple-input and multiple-output (MIMO) capacity equations that include channel attribute variables; query one or more second Wi-Fi access points or sensors located at a second location of the building plan to determine telemetry data for the channel attribute variables for the at least one Wi-Fi access point; and input values derived from the telemetry data for the channel attribute variables into the RF propagation model to update the RF propagation model based on historical telemetry data.

Aspect 37: The system of any of Aspects 20 to 36, wherein the telemetry data for the channel attribute variables for the at least one Wi-Fi access point includes estimates or averages for the channel attribute variables based on the historical telemetry data observed by a Wi-Fi system controller.

Aspect 38: The system of any of Aspects 20 to 37, wherein the channel attribute variables include at least one of channel load statistics, capacity information, or estimates of spectral, spatial, and temporal distribution of client devices consuming capacity.

Aspect 39: A non-transitory computer readable medium comprising instructions, the instructions, when executed by a computing system, cause the computing system to: receive telemetry data for at least one Wi-Fi access point located at a location of a building plan in a Wi-Fi visualization system; determine a change in a Wi-Fi coverage for the at least one Wi-Fi access point based on the telemetry data; and present a visualization illustrating the change in the Wi-Fi coverage for the at least one Wi-Fi access point.

Aspect 40: The computer readable medium of Aspect 39, wherein the computer readable medium further comprises instructions that, when executed by the computing system, cause the computing system to: present the change in the Wi-Fi coverage for the at least one Wi-Fi access point; and persist the presented change in the visualization according to a decay factor, wherein the decay factor expires when another change in the Wi-Fi coverage occurs.

Aspect 41: The computer readable medium of any of Aspects 39 to 40, the telemetry data is received from at least one of one or more sensors, at least one second Wi-Fi access point, or a client device located at a second location of the building plan.

Aspect 42: The computer readable medium of any of Aspects 39 to 41, the telemetry data includes a dynamic channel assignment, dynamic frequency selection (DFS), channel loads, co-channel interference, signal-to-noise ratio (SNR), or transmission power level adjustment.

Aspect 43: The computer readable medium of any of Aspects 39 to 42, wherein the computer readable medium further comprises instructions that, when executed by the computing system, cause the computing system to: visually identify the at least one Wi-Fi access point that is an origin for the change in the Wi-Fi coverage with a first identification; and visually identify a second Wi-Fi access point with a second identification, wherein a change in a Wi-Fi coverage for the second Wi-Fi access point is a result of the change in the Wi-Fi coverage for the at least one Wi-Fi access point that is the origin for the change in the Wi-Fi coverage.

Aspect 44: The computer readable medium of any of Aspects 39 to 43, wherein the computer readable medium further comprises instructions that, when executed by the computing system, cause the computing system to: determine that the SNR is greater than a threshold; and identifying an area of the building plan where the SNR is greater than the threshold.

Aspect 45: The computer readable medium of any of Aspects 39 to 44, wherein the computer readable medium further comprises instructions that, when executed by the computing system, cause the computing system to: store the telemetry data with a timestamp; and the presenting the visualization includes: presenting an animation of the change in the Wi-Fi coverage for the at least one Wi-Fi access point based on the stored telemetry data.

Aspect 46: The computer readable medium of any of Aspects 39 to 45, wherein the computer readable medium further comprises instructions that, when executed by the computing system, cause the computing system to: present the animation with a time slider to facilitate manipulation of a time axis associated with the timestamp for the telemetry data to visualize the change in the Wi-Fi coverage for the at least one Wi-Fi access point at times corresponding to the timestamp.

Aspect 47: The computer readable medium of any of Aspects 39 to 46, wherein the computer readable medium further comprises instructions that, when executed by the computing system, cause the computing system to: determine at least one first service area for the at least one Wi-Fi access point based on a predicted coverage of the at least one Wi-Fi access point at a first time; determine at least one second service area for the at least one Wi-Fi access point based on a predicted coverage of the at least one Wi-Fi access point at a second time; and present the animation of the QoS coverage by sequentially display the at least one first service area at the first time and the at least one second service area at the second time, wherein the predicted coverage is based on one or more parameters associated with a QoS.

Aspect 48: The computer readable medium of any of Aspects 39 to 47, the one or more parameters associated with the QoS includes at least one of SNR measurements, latency measurements, transmission power, and a number of client devices connected to the at least one Wi-Fi access point.

Aspect 49: The computer readable medium of any of Aspects 39 to 48, wherein the computer readable medium further comprises instructions that, when executed by the computing system, cause the computing system to: detect a poor QoS area by compare the one or more parameters associated with the QoS with a threshold; and visually identify the poor QoS area in the animation of the QoS coverage.

Aspect 50: The computer readable medium of any of Aspects 39 to 49, wherein the computer readable medium further comprises instructions that, when executed by the computing system, cause the computing system to: provide one or more suggestions to improve the one or more parameters associated with the QoS for the poor QoS area in the animation of the QoS coverage.

Aspect 51: The computer readable medium of any of Aspects 39 to 50, wherein the computer readable medium further comprises instructions that, when executed by the computing system, cause the computing system to: provide one or more simulated visualizations of an improved Wi-Fi coverage based on the one or more suggestions.

Aspect 52: The computer readable medium of any of Aspects 39 to 51, wherein the computer readable medium further comprises instructions that, when executed by the computing system, cause the computing system to: identify a time in which a periodic change in use of the DFS channel occurs, wherein the visualization is a 5 GHz DFS channel allocation animation and the change in the Wi-Fi coverage for the at least one Wi-Fi access point at times corresponding to the timestamp is a change in use of a DFS channel.

Aspect 53: The computer readable medium of any of Aspects 39 to 52, the presenting the visualization illustrating the change in the Wi-Fi coverage for the Wi-Fi at least one access point includes presenting a radio frequency (RF) propagation pattern in 3-D for the at least one Wi-Fi access point.

Aspect 54: The computer readable medium of any of Aspects 39 to 53, wherein the computer readable medium further comprises instructions that, when executed by the computing system, cause the computing system to: calculate the RF propagation pattern for the at least one Wi-Fi access point based on a RF propagation model for the at least one Wi-Fi access point, the calculating include; project a plurality of ray-paths in a plurality of directions in 3-D space, wherein the ray-paths originate from the at least one Wi-Fi access point and emanate in a variety of X, Y, and Z planes; determine whether the ray-paths interface with one or more objects defined in the building plan; for each ray-path of the ray-paths that interface with the one or more objects defined in the building plan, segmenting the respective ray-path into contiguous segments of substantially uniform mediums; determine a RF signal strength at points along the contiguous segments of the ray-paths, wherein the RF signal strength degrades along the contiguous segments of the ray-paths as defined by the RF propagation model as a function of distance through the contiguous segments and characteristics of the RF propagation pattern through the substantially uniform mediums through which the segment traverses; and overlay the RF propagation pattern for the at least one Wi-Fi access point over a visualization of the building plan.

Aspect 55: The computer readable medium of any of Aspects 39 to 54, wherein the computer readable medium further comprises instructions that, when executed by the computing system, cause the computing system to: calculate the RF propagation pattern for the at least one Wi-Fi access point based on a RF propagation model for the at least one Wi-Fi access point, wherein the RF propagation model is dependent on multiple-input and multiple-output (MIMO) capacity equations that include channel attribute variables; query one or more second Wi-Fi access points or sensors located at a second location of the building plan to determine telemetry data for the channel attribute variables for the at least one Wi-Fi access point; and input values derived from the telemetry data for the channel attribute variables into the RF propagation model to update the RF propagation model based on historical telemetry data.

Aspect 56: The computer readable medium of any of Aspects 39 to 55, the telemetry data for the channel attribute variables for the at least one Wi-Fi access point includes estimates or averages for the channel attribute variables based on the historical telemetry data observed by a Wi-Fi system controller.

Aspect 57: The computer readable medium of any of Aspects 39 to 56, the channel attribute variables include at least one of channel load statistics, capacity information, or estimates of spectral, spatial, and temporal distribution of client devices consuming capacity.

What is claimed is:

1. A method comprising:
receiving telemetry data for at least one Wi-Fi access point located at a location in a Wi-Fi visualization system;
determining a Wi-Fi coverage for the at least one Wi-Fi access point based on the telemetry data according to a time-based temporal factor, wherein the time-based temporal factor expires when a change in the Wi-Fi coverage occurs; and
presenting a visualization illustrating the Wi-Fi coverage for the at least one Wi-Fi access point.

2. The method of claim 1, wherein the telemetry data is received in real-time, and the presenting the visualization includes:
presenting the change in the Wi-Fi coverage for the at least one Wi-Fi access point, and
persisting the presented change in the visualization according to a decay factor, wherein the decay factor expires when the change in the Wi-Fi coverage occurs.

3. The method of claim 1, wherein the telemetry data includes a dynamic channel assignment, dynamic frequency selection (DFS), channel loads, co-channel interference, or transmission power level adjustment.

4. The method of claim 1, further comprising:
storing the telemetry data with a timestamp;
wherein the presenting the visualization includes: presenting an animation of the change in the Wi-Fi coverage for the at least one Wi-Fi access point based on the stored telemetry data.

5. The method of claim 4, further comprising:
presenting the animation with a time slider to facilitate manipulation of a time axis associated with the timestamp for the telemetry data to visualize the change in the Wi-Fi coverage for the at least one Wi-Fi access point at times corresponding to the timestamp.

6. The method of claim 5, wherein the animation of the change in the Wi-Fi coverage includes an animation of a quality of service (QOS) coverage, the method comprising:
determining at least one first service area for the at least one Wi-Fi access point based on a predicted coverage of the at least one Wi-Fi access point at a first time;
determining at least one second service area for the at least one Wi-Fi access point based on a predicted coverage of the at least one Wi-Fi access point at a second time; and
presenting the animation of the QoS coverage by sequentially displaying the at least one first service area at the first time and the at least one second service area at the second time, wherein the predicted coverage is based on one or more parameters associated with a QoS.

7. The method of claim 5, wherein the visualization is a 5GHz DFS channel allocation animation, and wherein the change in the Wi-Fi coverage for the at least one Wi-Fi access point at times corresponding to the timestamp is a change in use of a DFS channel, the method further comprising:
identifying a time in which a periodic change in use of the DFS channel occurs.

8. The method of claim 1, wherein the Wi-Fi coverage includes a radio frequency (RF) propagation pattern, the method further comprising:
calculating the RF propagation pattern for the at least one Wi-Fi access point based on a RF propagation model for the at least one Wi-Fi access point, wherein the RF propagation model is dependent on multiple-input and multiple-output (MIMO) capacity equations that include channel attribute variables;
querying one or more second Wi-Fi access points or sensors located at a second location of a building plan to determine telemetry data for the channel attribute variables for the at least one Wi-Fi access point; and
inputting values derived from the telemetry data for the channel attribute variables into the RF propagation model to update the RF propagation model based on historical telemetry data.

9. A system for visualizing a Wi-Fi access point radio frequency propagation pattern based on telemetry data, comprising:
a storage configured to store instructions;
a processor configured to execute the instructions and cause the processor to:
receive telemetry data for at least one Wi-Fi access point located at a location in a Wi-Fi visualization system;
determine a Wi-Fi coverage for the at least one Wi-Fi access point based on the telemetry data according to a time-based temporal factor, wherein the time-based temporal factor expires when a change in the Wi-Fi coverage occurs; and
present a visualization illustrating the Wi-Fi coverage for the at least one Wi-Fi access point.

10. The system of claim 9, wherein the processor is configured to execute the instructions and cause the processor to:
present the change in the Wi-Fi coverage for the at least one Wi-Fi access point; and
persist the presented change in the visualization according to a decay factor, wherein the decay factor expires when the change in the Wi-Fi coverage occurs.

11. The system of claim 9, wherein the telemetry data includes a dynamic channel assignment, dynamic frequency selection (DFS), channel loads, co-channel interference, or transmission power level adjustment.

12. The system of claim 9, wherein the processor is configured to execute the instructions and cause the processor to:
store the telemetry data with a timestamp; and
the presenting the visualization includes: presenting an animation of the change in the Wi-Fi coverage for the at least one Wi-Fi access point based on the stored telemetry data.

13. The system of claim 12, wherein the processor is configured to execute the instructions and cause the processor to:
present the animation with a time slider to facilitate manipulation of a time axis associated with the timestamp for the telemetry data to visualize the change in the Wi-Fi coverage for the at least one Wi-Fi access point at times corresponding to the timestamp.

14. The system of claim 13, wherein the processor is configured to execute the instructions and cause the processor to:
determine at least one first service area for the at least one Wi-Fi access point based on a predicted coverage of the at least one Wi-Fi access point at a first time;
determine at least one second service area for the at least one Wi-Fi access point based on a predicted coverage of the at least one Wi-Fi access point at a second time; and
present the animation of QoS coverage by sequentially displaying the at least one first service area at the first time and the at least one second service area at the second time, wherein the predicted coverage is based on one or more parameters associated with a QoS.

15. A non-transitory computer readable medium comprising instructions, the instructions, when executed by a computing system, cause the computing system to:
receive telemetry data for at least one Wi-Fi access point located at a location in a Wi-Fi visualization system;
determine a Wi-Fi coverage for the at least one Wi-Fi access point based on the telemetry data according to a time-based temporal factor, wherein the time-based temporal factor expires when a change in the Wi-Fi coverage occurs; and
present a visualization illustrating the Wi-Fi coverage for the at least one Wi-Fi access point.

16. The computer readable medium of claim 15, wherein the computer readable medium further comprises instructions that, when executed by the computing system, cause the computing system to:
present the change in the Wi-Fi coverage for the at least one Wi-Fi access point; and
persist the presented change in the visualization according to a decay factor, wherein the decay factor expires when the change in the Wi-Fi coverage occurs.

17. The computer readable medium of claim 15, the telemetry data includes a dynamic channel assignment, dynamic frequency selection (DFS), channel loads, co-channel interference, or transmission power level adjustment.

18. The computer readable medium of claim 15, wherein the computer readable medium further comprises instructions that, when executed by the computing system, cause the computing system to:
store the telemetry data with a timestamp; and
the presenting the visualization includes: presenting an animation of the change in the Wi-Fi coverage for the at least one Wi-Fi access point based on the stored telemetry data.

19. The computer readable medium of claim 18, wherein the computer readable medium further comprises instructions that, when executed by the computing system, cause the computing system to:
present the animation with a time slider to facilitate manipulation of a time axis associated with the timestamp for the telemetry data to visualize the change in the Wi-Fi coverage for the at least one Wi-Fi access point at times corresponding to the timestamp.

20. The computer readable medium of claim 19, wherein the computer readable medium further comprises instructions that, when executed by the computing system, cause the computing system to:
determine at least one first service area for the at least one Wi-Fi access point based on a predicted coverage of the at least one Wi-Fi access point at a first time;
determine at least one second service area for the at least one Wi-Fi access point based on a predicted coverage of the at least one Wi-Fi access point at a second time; and
present the animation of QoS coverage by sequentially displaying the at least one first service area at the first time and the at least one second service area at the second time, wherein the predicted coverage is based on one or more parameters associated with a QoS.

\* \* \* \* \*